INVENTORS.
PHILIP N. BRAUN
BY VINCENT P. BRAUN
D. Emmett Thompson
ATTORNEY.

INVENTORS.
PHILIP N. BRAUN
VINCENT P. BRAUN
BY D. Emmett Thompson
ATTORNEY.

Jan. 30, 1968 P. N. BRAUN ET AL 3,366,040

APPARATUS FOR LISTING, MARKING AND CLASSIFYING ARTICLES OF LAUNDRY

Filed April 26, 1965 17 Sheets-Sheet 3

INVENTORS.
PHILIP N. BRAUN
BY VINCENT P. BRAUN
D. Emmett Thompson
ATTORNEY.

Jan. 30, 1968 P. N. BRAUN ET AL 3,366,040

APPARATUS FOR LISTING, MARKING AND CLASSIFYING ARTICLES OF LAUNDRY

Filed April 26, 1965 17 Sheets-Sheet 4

INVENTORS.
PHILIP N. BRAUN
VINCENT P. BRAUN

BY D. Emmett Thompson
ATTORNEY.

INVENTORS.
PHILIP N. BRAUN
VINCENT P. BRAUN
D. Emmett Thompson
ATTORNEY.

INVENTORS.
PHILIP N. BRAUN
VINCENT P. BRAUN
D. Emmett Thompson
ATTORNEY.

INVENTORS.
PHILIP N. BRAUN
VINCENT P. BRAUN
BY
D. Emmett Thompson
ATTORNEY.

INVENTORS.

PHILIP N. BRAUN

VINCENT P. BRAUN

D. Emmett Thompson

ATTORNEY.

INVENTORS.
PHILIP N. BRAUN
BY VINCENT P. BRAUN
D. Emmett Thompson
ATTORNEY.

INVENTORS.
PHILIP N. BRAUN
VINCENT P. BRAUN
BY D. Emmett Thompson
ATTORNEY.

*INVENTORS.*
PHILIP N. BRAUN.
VINCENT P. BRAUN.
*BY* D Emmett Thompson
ATTORNEY.

INVENTORS.
PHILIP N. BRAUN
VINCENT P. BRAUN
BY D. Emmett Thompson
ATTORNEY.

INVENTORS.
PHILIP N. BRAUN
BY VINCENT P. BRAUN
D. Emmett Thompson
ATTORNEY.

Jan. 30, 1968 P. N. BRAUN ET AL 3,366,040

APPARATUS FOR LISTING, MARKING AND CLASSIFYING ARTICLES OF LAUNDRY

Filed April 26, 1965

17 Sheets-Sheet 14

*INVENTORS.*

PHILIP N. BRAUN

*BY* VINCENT P. BRAUN

*D. Emmett Thompson*

ATTORNEY.

INVENTORS.
PHILIP N. BRAUN
BY VINCENT P. BRAUN
D. Emmett Thompson
ATTORNEY.

INVENTORS.
PHILIP N. BRAUN
VINCENT P. BRAUN
BY
D. Emmett Thompson
ATTORNEY.

INVENTORS.
PHILIP N. BRAUN
VINCENT P. BRAUN
BY D. Emmett Thompson
ATTORNEY.

3,366,040
Patented Jan. 30, 1968

3,366,040

APPARATUS FOR LISTING, MARKING AND CLASSIFYING ARTICLES OF LAUNDRY

Philip N. Braun and Vincent P. Braun, Syracuse, N.Y., assignors to Tag-O-Matic Machine Co., Inc., Syracuse, N.Y., a corporation of New York Filed Apr. 26, 1965, Ser. No. 450,677
5 Claims. (Cl. 101—2)

This invention relates to a system and apparatus for listing, marking and classifying articles in a bundle of laundry.

The invention has as an object a system embodying a listing machine, a marking machine and a classifier, and wherein the components are power operated and interconnected and interlocked to function in a predetermined sequence to list, mark and classify an article.

The invention has as a further object a system including an arrangement of components including a listing machine, marking machine and classifier, which machines are normally inoperable, and wherein the operator is required to operate two actuators in predetermined sequence, whereupon the listing machine, marking machine and classifier are power operated for the listing, marking and classifying of an article.

The invention has as a further object a marking machine having clamping means operable, upon actuation, to clamp an article to the article supporting platen of the marking machine, the marking machine being thereupon operable upon actuation of a switch.

The invention has as a further object a marking machine including an article supporting platen and an article ejection member mounted on the platen and operable to eject a marked article from the platen.

The invention has as a further object a listing machine, an actuating switch for each kind of article, the machine being operable upon actuation of one of said actuators to list the article, and the machine embodying power operated means for resetting the listing type to normal position.

The invention consists in the novel features and in the combinations and constructions hereinafter set forth and claimed.

In describing this invention, reference is made to the accompanying drawings in which like characters designate corresponding parts in all the views.

In the drawings—

FIGURE 10 illustrates the article supporting arm in the down or normal position, and the article clamp member in unclamped position.

FIGURE 11 is similar to FIGURE 10, with the article clamp moved into clamping position.

FIGURE 12 illustrates the arrangement of the parts when the article supporting arm has been moved approximately half the distance towards the marking means.

FIGURE 13 shows the article supporting arm moved into marking relation to the marking means.

FIGURE 14 illustrates the article supporting arm moved rearwardly, or from the marking means, to a position about midway between the marking means and normal position, and showing the article clamp being moved to open, or unclamped position.

FIGURE 15 is a view, similar to FIGURE 14, with the article supporting arm moved further toward normal position.

Figure 1:
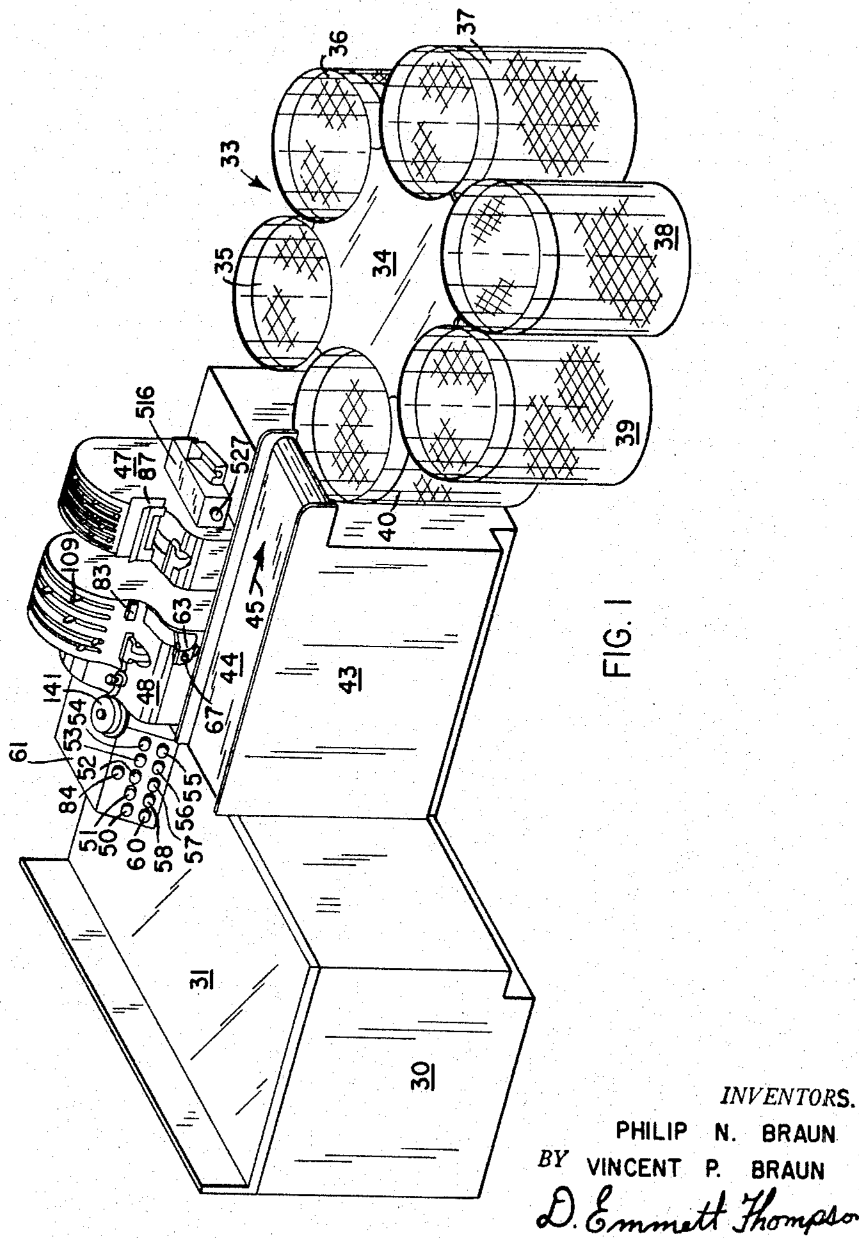
FIGURE 1 is a perspective view of a listing, marking and classifying installation.

Referring to FIGURE 1, 30 designates a sorting table on the top 31 of which the bundle of laundry is placed and opened. 33 designates generally the classifying machine which, in the form here shown, embodies a turret 34 mounted for intermittent rotation about a vertical axis and from which a plurality of article receiving bags 35–40 depend. A conveyor 43 is provided with an endless belt 44 moving in the direction of the arrow 45. The conveyor extends from the sorting table 30 to the classifying machine. The conveyor belt 44 is substantially co-planar with the table top 31, and functioning to deposit articles into the bags 35–40. 47 designates the listing machine, and 48 the marking machine.

The listing machine 47 and marking machine 48, and the classifier 33 are interconnected and interlocked to function in a predetermined time sequence by actuation of buttons 50–60, contained in a console 61.

Figure 32:
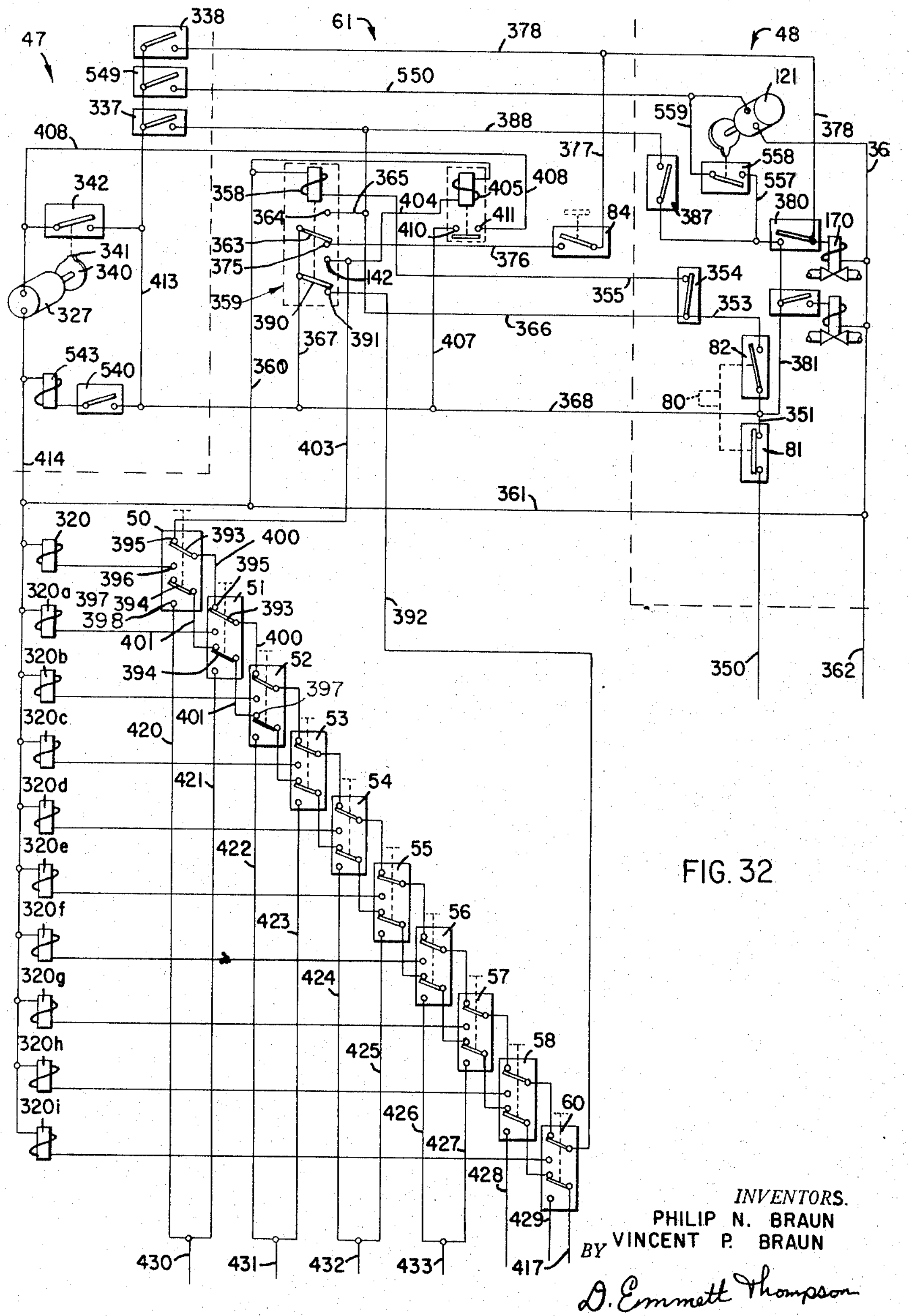
FIGURE 32 is a schematic wiring diagram showing the interlock circuitry between the lister, marking machine and classifier.

In general the operation or procedure in listing the articles in a bundle of laundry positioned on the top 31 of cabinet 30 is as follows:

The operator actuates button 80 to close the contacts of switches 81, 82, see FIGURE 32, to supply power to the machines. The print wheels on the marking machine 48 are adjusted to print the customer's identifying indicia and the bundle number type print wheel in the marking machine is adjusted to print the desired bundle number. Thereupon the operator positions the invoice, taken from the bundle, in front of the marking means 83 in the marking machine, and actuates switch 84, which causes the article supporting arm 85 to move upwardly to cause a platen 86 on arm 85 to press the invoice against the marking means 83 to mark the invoice with the identification indicia and the bundle number.

Figure 21:
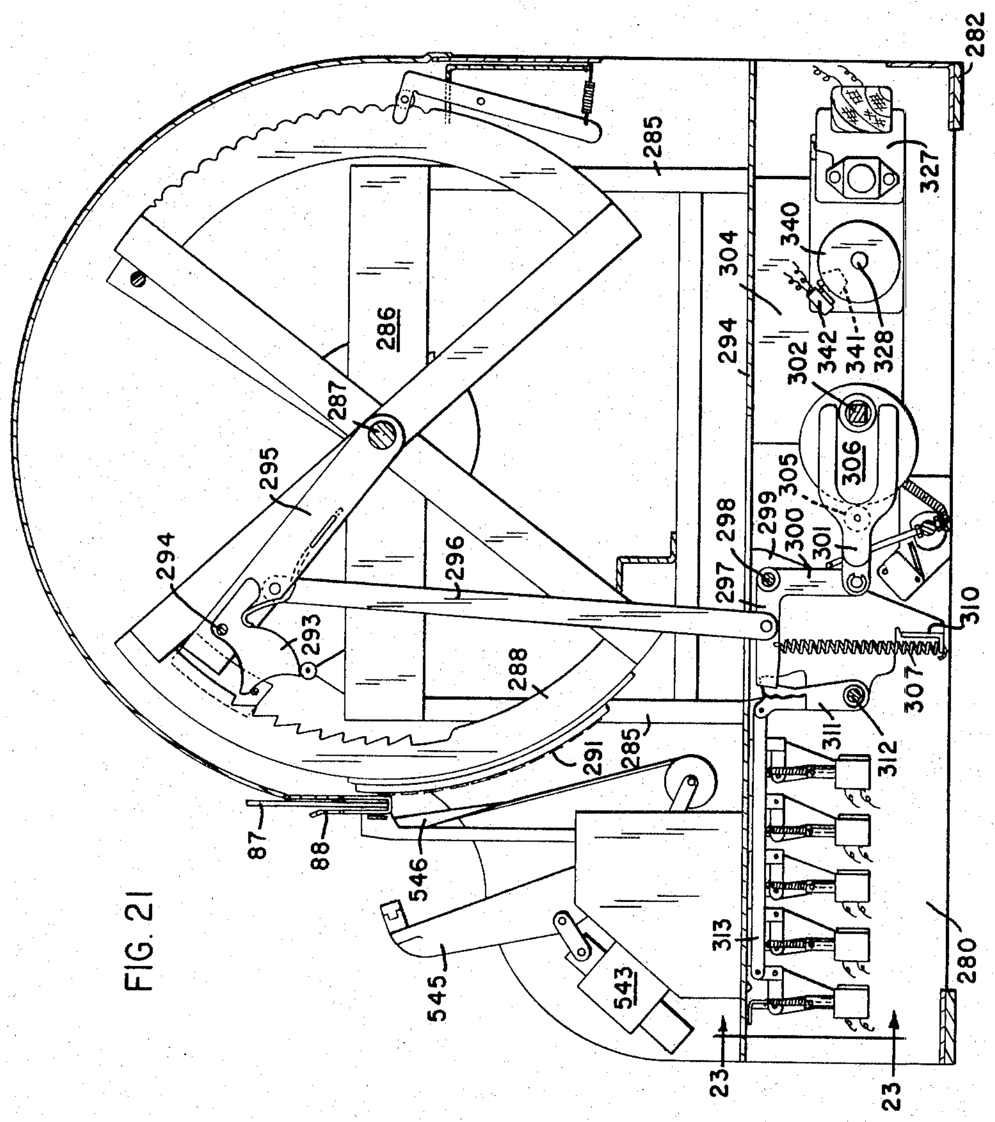
FIGURE 21 is a foreshortened lengthwise sectional view taken on line 21—21, FIGURE 20.
Figure 24:
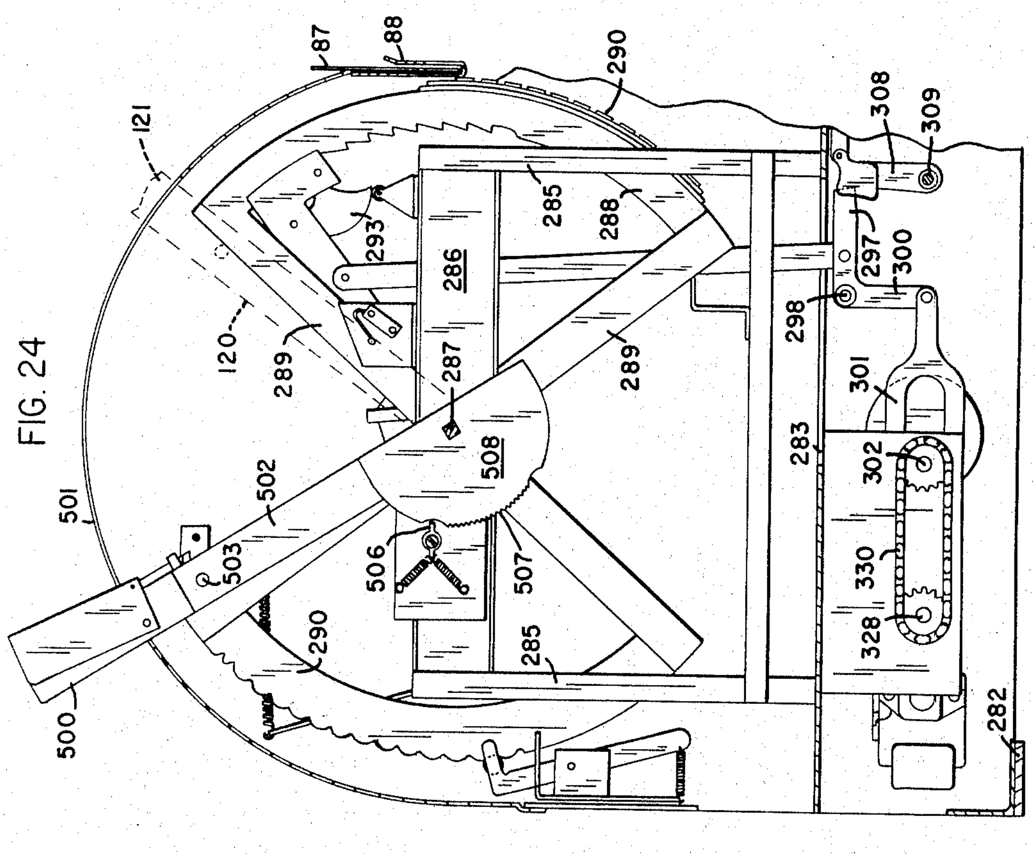
FIGURE 24 is a view of the rear portion of the listing machine, with the side of the casing removed, the view looking to the right of the lister as it is positioned in FIGURE 1.

The marked invoice 87, FIGURES 21, 24, is then placed in a holder 88 on the listing machine. An article A is selected from the bundle and positioned on the article supporting arm 85, thereupon the article clamp release button 90 is depressed resulting in movement of the article clamp 91 into clamping position to clamp the article to the arm. One of the keys or buttons 50–60 on the console 61 is then pressed. Each of the buttons 50–60 correspond to a kind of articles; for example, button 50 may designate a shirt, button 51 a sheet, etc. Depression of one of the buttons 50–60 effects movement of the arm 85 upwardly to move the article clamped thereto into engagement with the marking means 83 to effect proper marking of the article.

Simultaneously, the actuation of the button 50–60 effects indexing or advancement of the corresponding print type wheel in the lister. It also effects indexing of the turret 34 to position the proper bag 35–40 underneath the discharged end of the conveyor belt 44.

After the garment is marked, the platen arm 85 returns to normal position and the article is ejected from the platen onto the conveyor belt 44,. and the conveyor belt is actuated in the direction of the arrow 45 to deposit the marked article into the proper bag, which by that time has been positioned at the discharge end of the conveyor.

After the operator has marked the invoice by actuation of switch 84, the listing machine is rendered inoperable and remains so until the button 90 is again actuated to move the clamp 91 into clamping position. Accordingly, after the invoice has been marked, the operator is required to place an article on the arm 85 and actuate the button 90, which renders the listing machine operable. When one of the console buttons 50–60 is then actuated to initiate the series of listing, marking and classifying functions above referred to, the listing machine 47 is again rendered inoperable and remains so until the platen arm 85 has returned to normal position, as shown in FIGURES 3 and 4, and the button 90 is again operated to clamp the next article to the supporting arm and thereupon the listing machine is again rendered operable.

The marking machine is in general of the type shown in Patents 2,825,480 and 2,887,314 issued to P. N. Braun and Patent 2,796,607 issued to Filsinger and Bridgewater. In the machine shown, the arm 85 is fixed to a shaft 100 journalled in plates 101, 102 and 103 extending upwardly from a base plate 104, see FIGURE 2. The invoice and the article are marked by having an identification tag affixed thereto. In the machine shown, the marking means 83 consist of a heater iron, the tag being coated on the side confronting the article with a thermoplastic material. The marking means 83 may take other forms, such as a stapling head by which the tag is stapled to the invoice and article, as shown in Patent 2,796,607.

Figure 3:
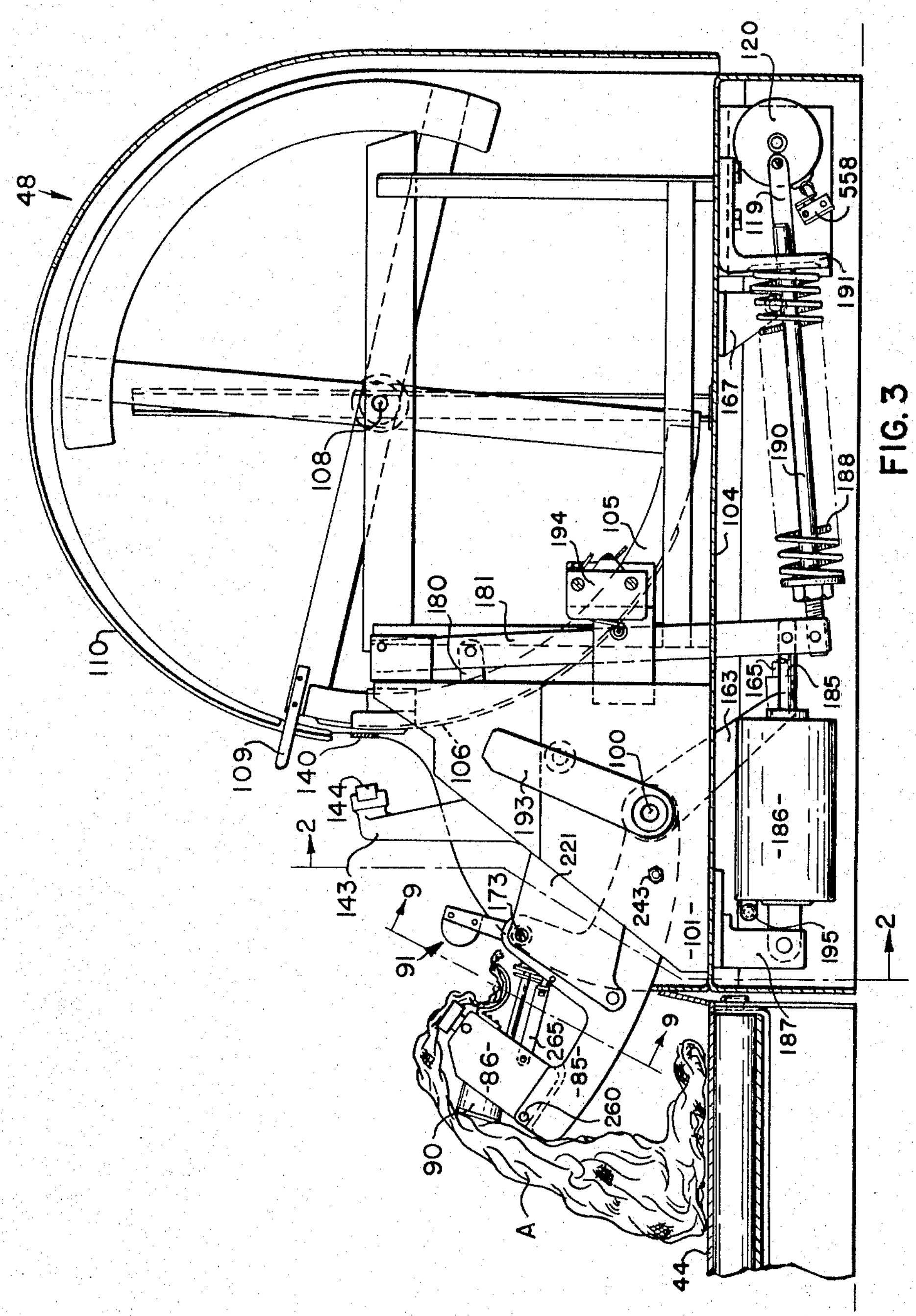
FIGURE 3 is a view taken on line 3—3, FIGURE 2.
Figure 4:
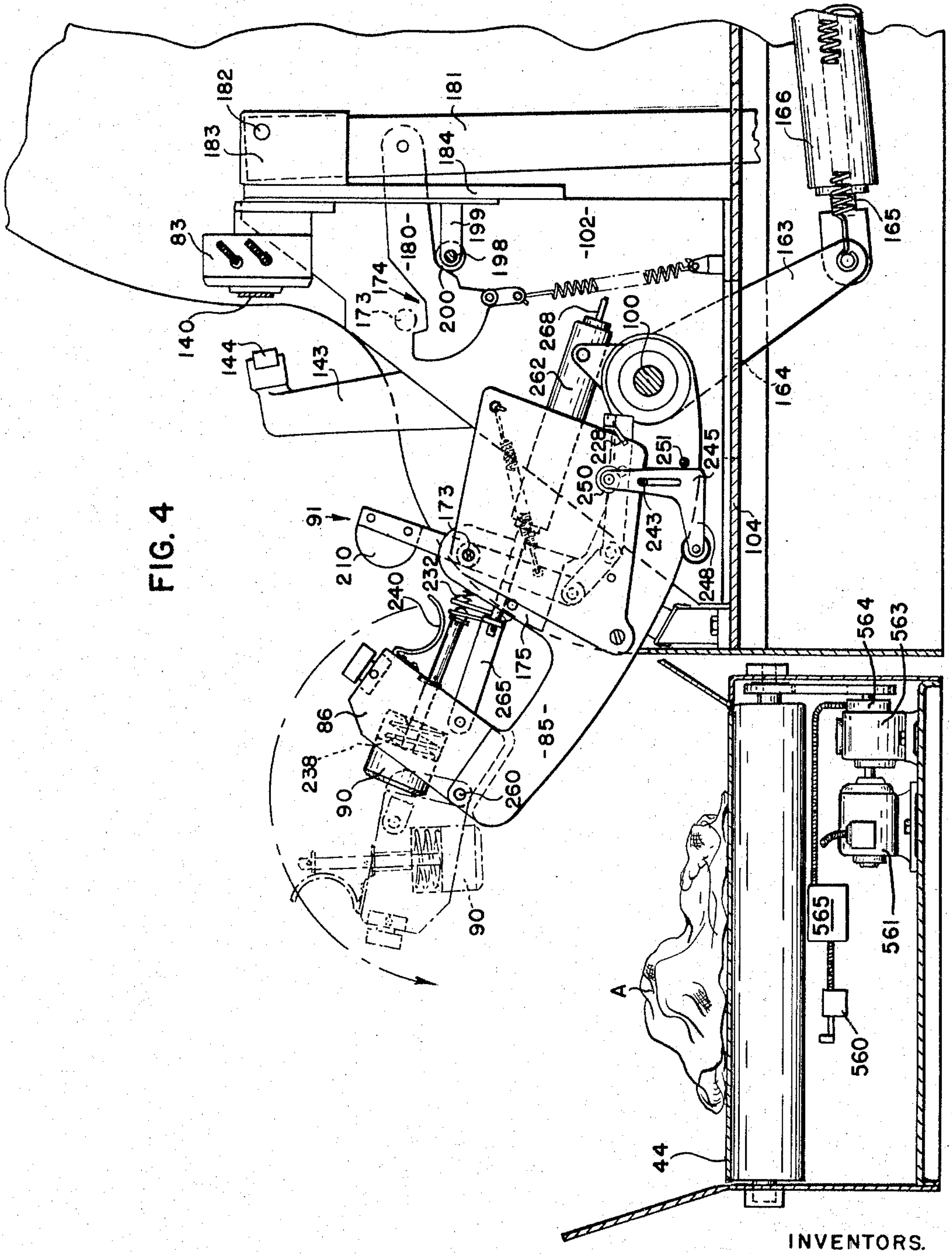
FIGURE 4 is a view taken on line 4—4, FIGURE 2.
Figure 5:
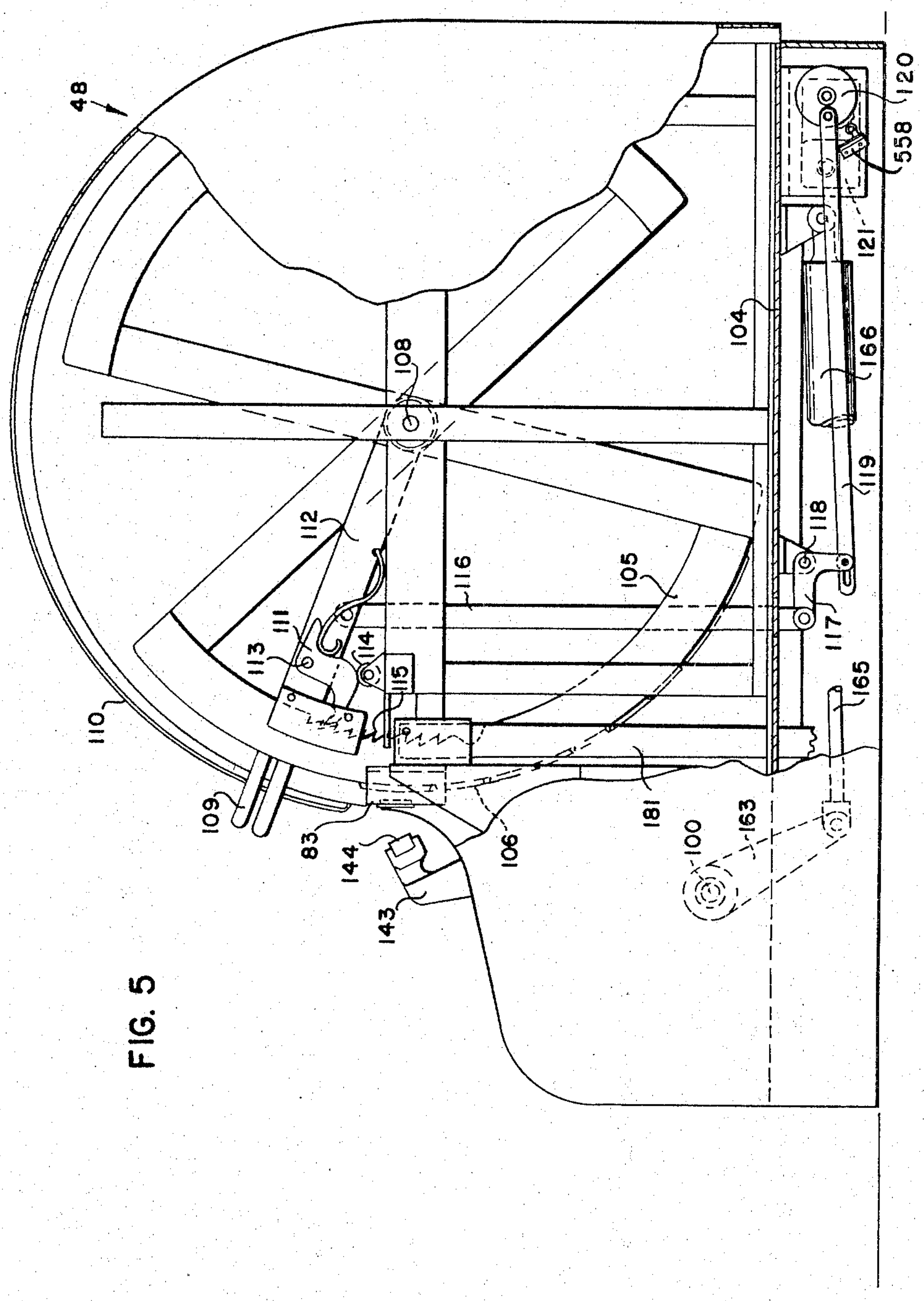
FIGURE 5 is a view taken on line 5—5, FIGURE 2.

The marking machine is provided with a number of segments 105, see FIGURES 3 and 5, which carry print type 106. These segments are movable about an axis 108, and each segment is provided with a handle 109. The handles 109 extend through slots formed in the curved front cover 110 of the machine casing. The type carried by certain of the segments 105 are adjusted to a print line to print on the tags the customer's identification indicia. Other of the segments 107 carry type movable to the print line to print the bundle number on the tag. These latter type segments are indexed by a cam ratchet 111, see FIGURE 5, carried by an arm 112 movable about the axis 108. Upon downward movement of the arm 112, the ratchet 111 is moved about its pivot 113 by engagement with a fixed roller 114 into engagement with ratchet teeth 115 on the inner surface of the type segment, and effects advancement of the type segment one increment.

The arm 112 is pulled downwardly by a link 116, the lower end of which is connected to a bell crank 117 pivotally mounted in the base section of the machine at 118, and having connection with a link 119 which is reciprocated by a crank disk 120 operated by a motor 121.

Figures 2, 8:
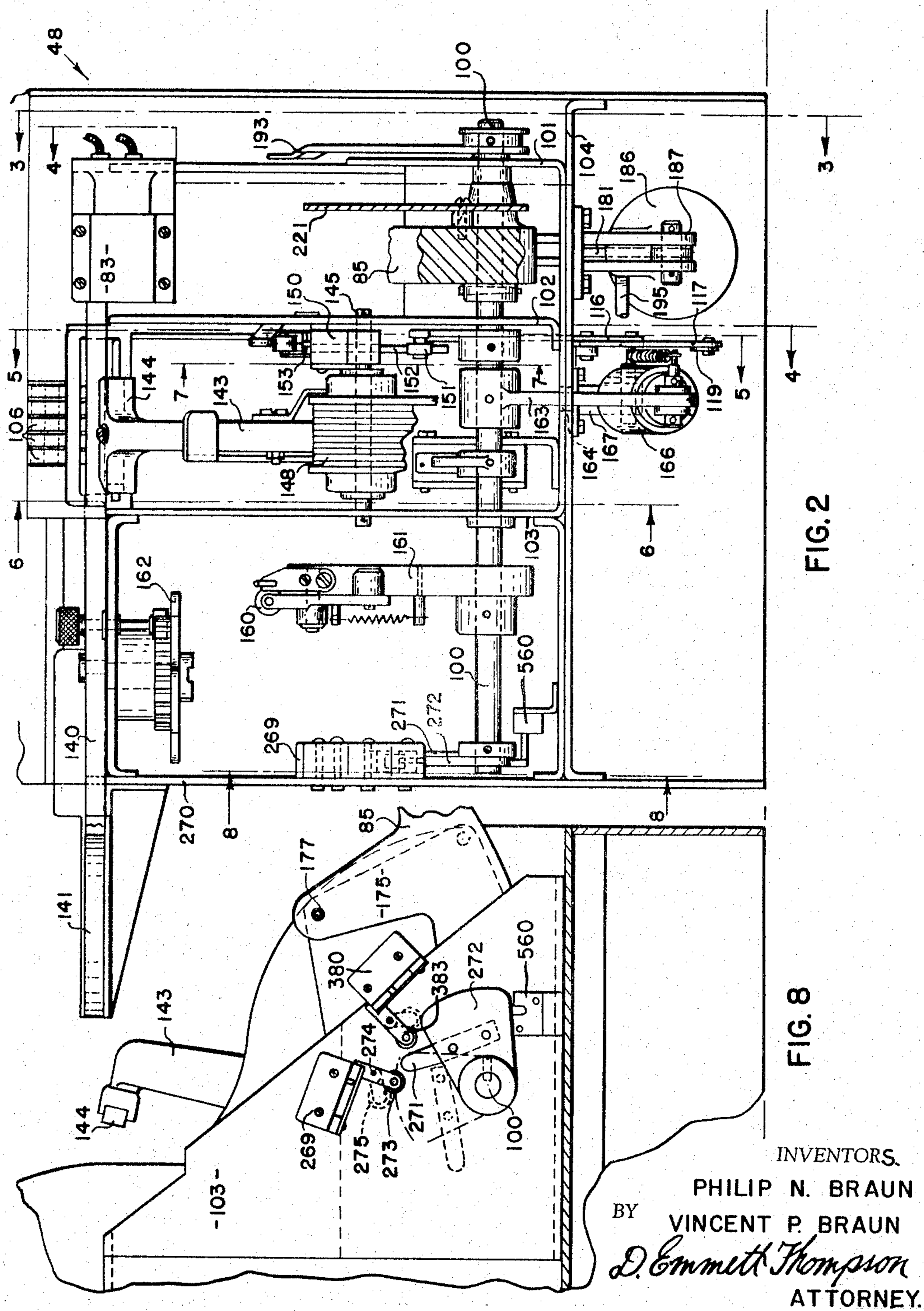
FIGURE 2 is a front elevational view of the lower portion of the marking machine, with the front casing and parts removed, and parts in section.
FIGURE 8 is a view taken on line 8—8, FIGURE 2.

The identification tags are formed from a tape 140 fed from a roll supply 141, see FIGURE 2. The end portion of the tape 140 is positioned at the print line in front of the type on the segments 105. The printing is done by a print platen 143, see FIGURES 4 and 6, moved upwardly to cause the platen 144 to press the tape 140 against the tape. The print platen arm 143 is mounted on a shaft 145 journalled in the plates 102, 103. The arm 143 is connected by link 146 to the plunger 147 of a solenoid 148, which is energized by a switch 150, see FIGURES 2 and 7. The switch 150 is actuated by a roller 151 engaging the lower end of a pivotally mounted bell crank lever 152, the opposite leg of which engages the actuator 153 of switch 150. The roller 151 is carried on a link 154 pivotally mounted intermediate its ends at 155 to an arm 156 fixed to the shaft 100. The link 151 is normally positioned against a stop pin 157 by a weight 158 fixed to the opposite end of the link. The arrangement is such that the roller 151 engages the actuating bell crank 152 upon the initial movement of the platen arm 85 upwardly from normal position. The actuation of the switch 150 is momentary. It will be seen, referring to FIGURE 7, that upon counterclockwise movement of the arm 156, the link 151 cannot move in a clockwise direction about its pivot 155 because of the stop pin 157 and therefore the bell crank is moved in a clockwise direction. However, upon return movement of the platen arm 85 and the arm 156, engagement of the roller 151 with the bell crank 152 will result in counterclockwise pivotal movement of the link 151 without actuation of the switch 150.

Immediately following the printing of the indicia on the tape 140, a roller 160, carried by arm 161 fixed to the shaft 100, engages a star wheel 162 to impart rotary movement thereof to effect advancement of the tape 140 to the right, FIGURE 2, to position the printed end portion of the tag in overlying relation to the marking means 83. This advancement taking place prior to the engagement of the article on the platen 86 with the printed end portion of the tape. This printing and feeding of the tape is disclosed in greater detail in the patents above referred to.

Figures 6, 7:
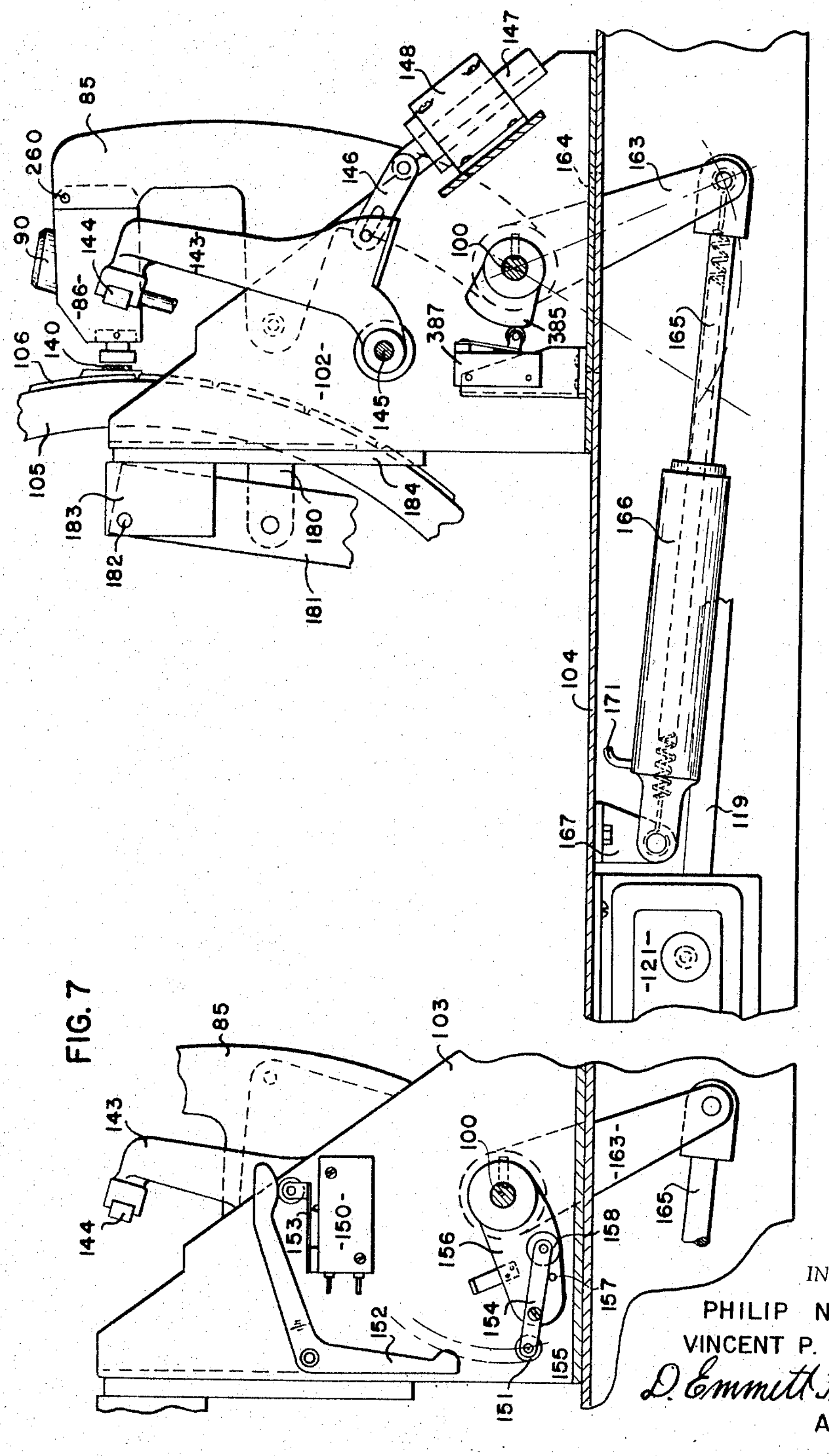
FIGURE 6 is a view taken on line 6—6, FIGURE 2.
FIGURE 7 is a view taken on line 7—7, FIGURE 2.

An arm 163 is fixed to the shaft 100 and extends downwardly through a slot 164, FIGURE 6, in the base plate 104. The lower end of this arm is pivotally connected to a piston rod 165 extending forwardly from a cylinder 166, the rear end of which is pivotally mounted on a bracket 167 secured to the underside of the plate 104. When the operator depresses one of the buttons 50–60, a two-way solenoid valve 170, FIGURE 32, is actuated to provide fluid pressure to the conduit 171 connected to the rear end of the cylinder 166 to effect outward movement of the piston rod 165 to the position shown in FIGURE 6 to effect movement of the arm 85 from normal position upwardly toward the marking means 83. The complete circuitry for the control of valve 170 will be explained in connection with FIGURE 32. A roller 173 is mounted between the legs of a bifurcated boss 175 formed integral with the arm 85. The roller 173 is mounted on a pin 177. When the arm 85 has moved upwardly by cylinder 166 to place the platen 186 in proximity with marking means 83, the roller 173 is positioned above a notch 174 formed in a link 180, see FIGURE 4. The inner end of this link is pivotally connected to a link 181, the upper end of which is pivotally connected at 182 to a bracket 183 fixed to a cross plate 184 fixed to the side plates 101, 102.

The lower end of the link 181 is connected to a piston rod 185 mounted in a cylinder 186 pivotally supported at its forward end by a bracket 187 depending from the plate 104, see FIGURE 3. The link 181 is urged forwardly by a compression spring 188 mounted on a rod 190, one end of which is pivotally connected to the link 181, and the opposite end being slidably mounted in an angular bracket 191, also depending from the plate 104.

When the roller 173 is positioned over the notch 174, an arm 193 actuates a switch 194, see FIGURE 3. Actuation of the switch 194 effects operation of a solenoid valve, not shown, to supply fluid to the conduit 195 connected to the forward end of the cylinder 186, to effect rearward movement of the link 181 about the pivot 182, and in turn to effect rearward movement of the link 180. The link 180 normally rests on a roller 198 carried by a bracket 199. The link 180 is formed with an inclined cam surface 200. Accordingly, upon rearward movement of the link 180, the link is first moved upwardly, whereby the roller 173 is engaged in the notch 174, and further rearward movement of the link 180 effects further movement of the arm 85 to move the article carried on the platen 86 against the marking means 83. The cylinder 186 is of relatively large bore and short stroke, and through the ratio of the link 181, high pressure is established between the article, tag and means 83. The circuit through the switch 194 to the solenoid valve for cylinder 186 includes an adjustable timer, not shown, for controlling the length of time the high pressure is maintained between the platen 86 and the marking means 83, where the marking means consists of the electric heater. Where the tags are attached to the articles by stapling, the switch 194 is only momentarily actuated by an actuating mechanism of the type shown in connection with actuation of the printing solenoid 148 in FIGURE 7.

During return of the platen arm 85 to normal position, the clamp member 91 is automatically moved to unclamped position and the marked article is ejected onto the conveyor belt 44.

Figure 9:
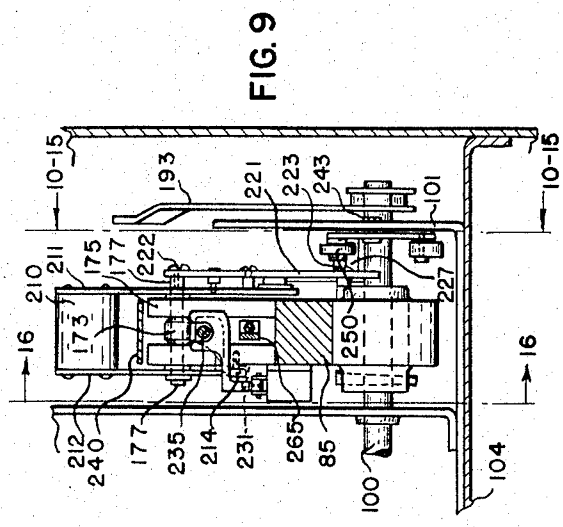
FIGURE 9 is a view taken on line 9—9, FIGURE 3.
Figure 11:
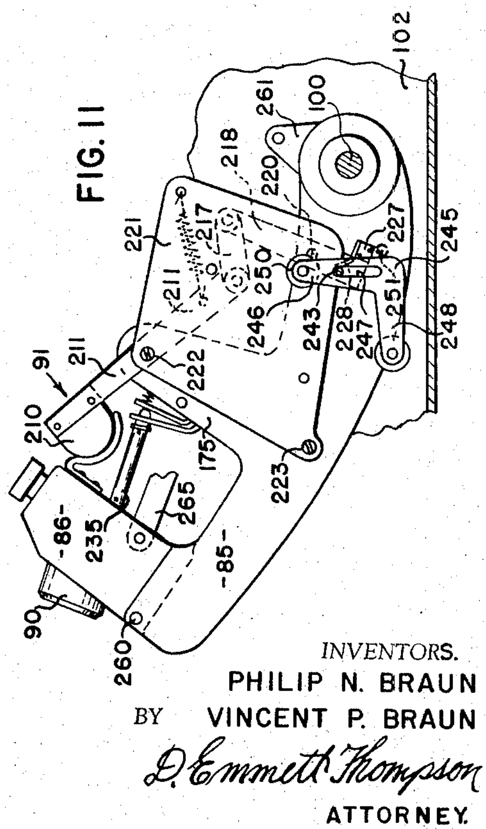
Figure 14:
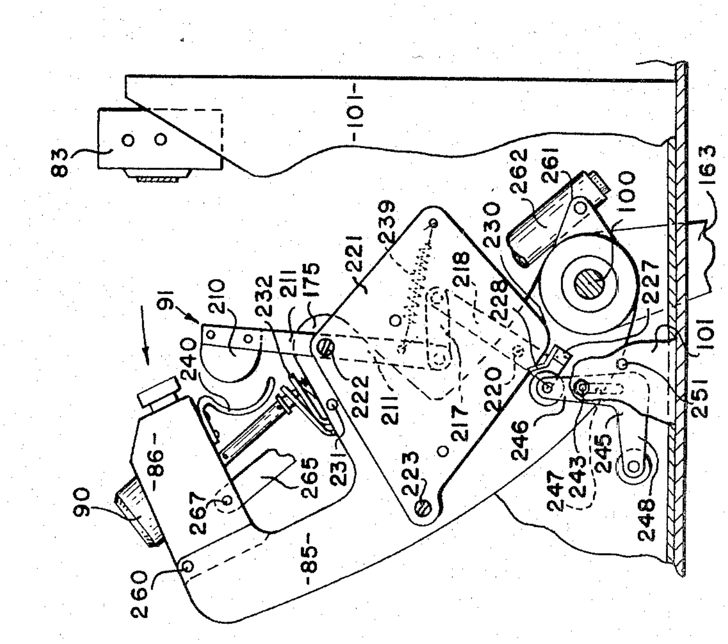
Figures 17, 18, 19:
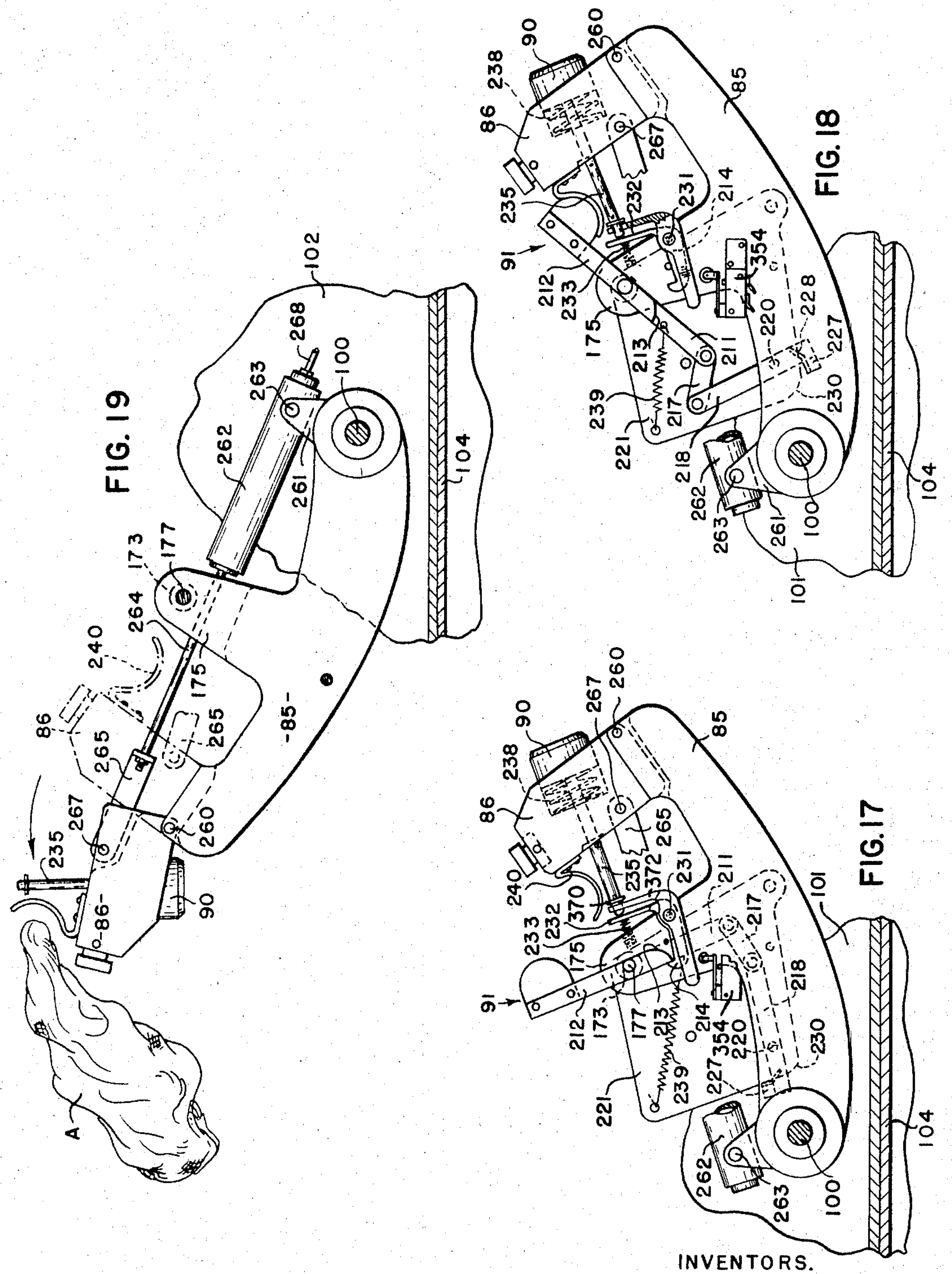
FIGURE 17 is a view, similar to FIGURE 16, with the garment platen arm returned to normal position.
FIGURE 18 is a view, similar to FIGURES 16 and 17, with the article clamp moved into clamping position. The view is similar to FIGURE 11, but taken on the opposite side of the garment platen arm.
FIGURE 19 is a view showing the garment platen arm returned to normal position, and with the article ejecting member moved to ejecting position.

Referring now to FIGURES 10 through 14, the article clamping member 91 consists of an article engaging block 210 mounted between the arms 211, 212. These arms are pivotally mounted on the shaft 177. The arm 212 extends a short distance beyond the pivot 177 and is curved, as shown, at 213 for engagement by a latch 214, see FIGURES 17 and 18. The arm 211 extends a greater distance from the pivot 177 and is pivotally connected at its lower end to a link 217 which, at its opposite end, is pivotally connected to a link 218. The link 218 is mounted on a pivot 220 extending inwardly from a plate 221. The plate 221 is affixed to the arm 85 by being secured to the pivot shaft 177, as by screws 222, and by a screw 223. The plate 221 is maintained in spaced relation to the arm 85, and also the arm 212, see FIGURE 9.

The link 218 extends past the pivot 220 and is provided at its free end with a laterally extending bracket 227 formed with an inclined portion 228. The bracket 227 moves about the lower rear corner 230 of the plate 221.

Figures 10, 12:
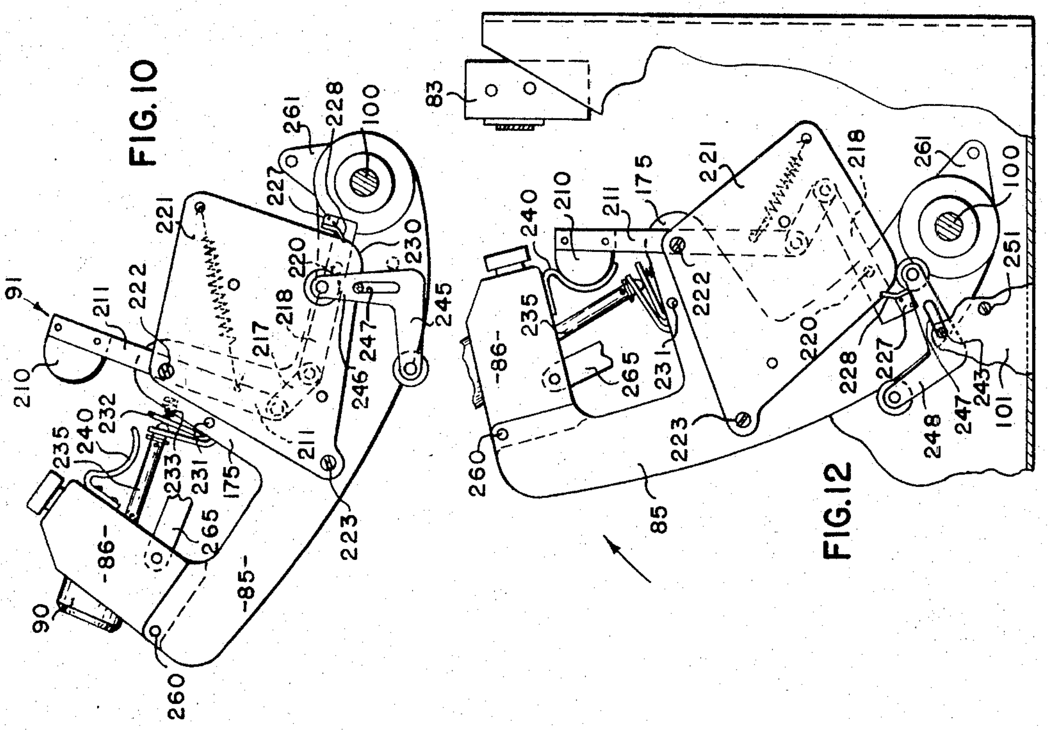
FIGURES 10, 11, 12, 13, 14 and 15 are views taken on lines 10–15, 10–15, FIGURE 9.

The clamp member 91 is shown in FIGURES 4 and 10 out of clamping position. It is maintained in this position by the latch 214 engaging the lower or inner end of the arm 212, see FIGURE 17. This latch is pivotally mounted on the arm boss 175 on a pivot 231, and has a portion 232 extending upwardly in front of the boss 175. The latch is urged into latching position by a compression spring 233 interposed between the portion 232 and the boss 175.

The portion 232 is engaged by a pin 235 slidably mounted in the platen 86, and provided at its outer end with the push button 90. The pin 235 is yieldingly urged outwardly by a compression spring 238 encircling the stem 235 and mounted in a recess formed in the platen 86. As previously explained, when the operator drapes an article over the platen 86, the button 90 is pushed inwardly to unlatch the clamp member 91, whereupon tension spring 239 causes the clamp to move about its pivot 177 to clamp the article to the platen, or against a concave member 240 attached to the inner face of the platen. The clamp member is shown in clamping position in FIGURES 11, 12 and 18.

The side plate 101 is provided with a pivot pin 243 extending inwardly toward the plate 221. A bell crank member 245 is formed, in the leg 246, with a slot 247 to receive the pivot pin 243. The bell crank member 245 normally hangs on the pivot 243, with the leg 246 in vertical position when the arm 85 is in normal return position, see FIGURES 10 and 11. The leg 246 is provided with roller 250 positioned on the inner side of the bell crank member. The roller on leg 246 is arranged in the path of movement of bracket 227 on link 218. The roller on leg 248 serves as a weight, which in conjunction with a stop pin 251, also carried by the plate 101, normally maintains the bell crank in the position shown in FIGURES 10 and 11.

Figure 13:
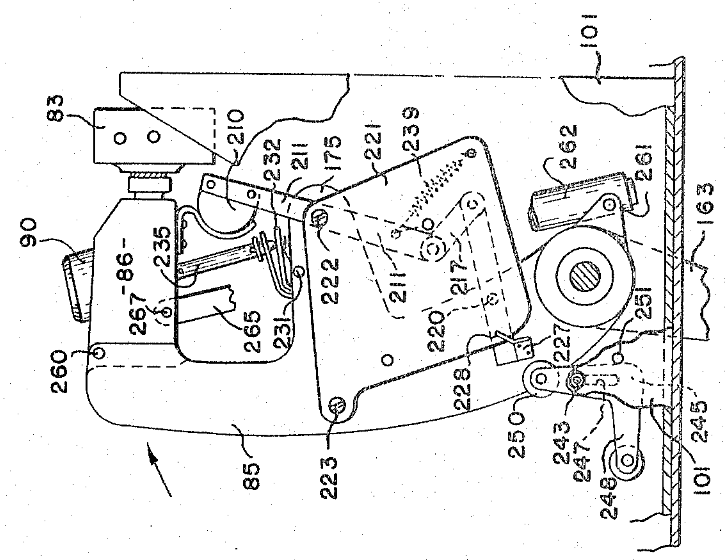
Figure 16:
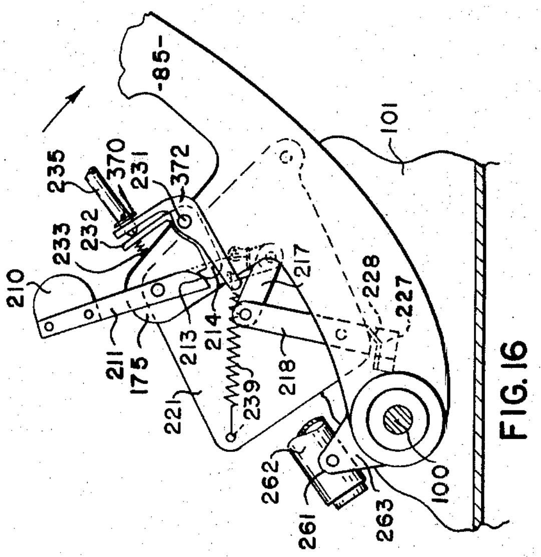
FIGURE 16 is a view taken on line 16—16, FIGURE 9, and with the garment platen arm in about the same position as shown in FIGURE 15.

As the arm 85 is moved upwardly by the cylinders 166, 186, the bracket 227 moves about the axis of shaft 100 into engagement with the roller 250 on the upper leg 246 of bell crank member 245, causing that member to swing about the pivot 243 and also moving the bell crank member to the position shown in FIGURE 12 and, as the platen 86 further approaches the marking means 83, the bracket 227 moves out of engagement with the roller 250, permitting the bell crank member to return to normal position, see FIGURE 13. Upon return movement of the arm 85, the inclined portion 228 of the bracket 227 engages the roller on the leg 246, FIGURE 14. The bell crank member cannot move about its pivot 243 in a counterclockwise direction because of the stop pin 251. However, the pivot 220 of link 218 is moving in a counterclockwise direction, FIGURE 14, relative to the arm 85 and the plate 221, effecting clockwise movement of the arm 212 to move the clamping member away from the member 240.

Figure 15:
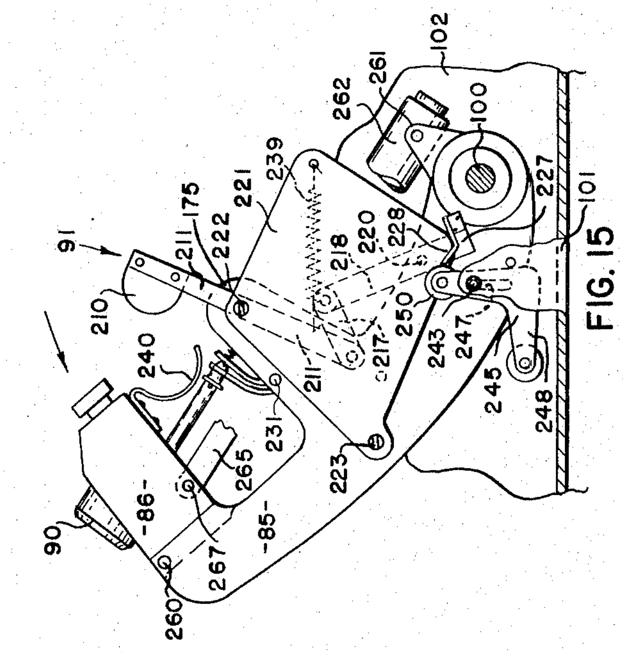

As the arm 85 continues movement to the normal position, the clamping member 91 is moved further towards open position, see FIGURE 15. At this time, the curved surface 213 of arm 212 has engaged the latch 214. In movement of the arm 85 from the position shown in FIGURE 15 to the full return position shown in FIGURES 10 and 17, the latch 214 has moved behind the end of the arm 212, and the clamping member 91 is now latched in open position preparatory to the next cycle of operation of the marking machine.

It will be apparent from the above description that the clamping member 91 is automatically moved to nonclamping position upon the returning of the arm 85 to normal position. The marking machine is provided with means for ejecting the marked article from the article supporting arm 85. In the form here shown the platen 86 serves as the ejection means. The platen 86 is pivotally connected to the arm 85 on a transversely extending pivot pin 260. The hub portion at the inner end of the arm 85 is formed with a pair of spaced apart bosses 261, between which a cylinder 262 is pivotally mounted on trunnions 263, FIGURE 19. A piston rod 264 extends from the free end of the cylinder and is connected at its outer end to a bar 265 which is pivotally connected to the platen 86 by pivot pin 267. Upon the arm 85 being returned from the marking means 83 to normal position, fluid under pressure is supplied to the conduit 268 connected to the inner or rear end of the cylinder 262, causing the piston rod 264 to move outwardly and causing the platen 86 to be moved in a counterclockwise direction, FIGURE 19, about the pivot pin 260 to eject the article A onto the conveyor belt 44. FIGURE 4.

Fluid is supplied to the conduit 268 through a solenoid valve, not shown, which is momentarily actuated when the arm 85 has returned to normal position, the valve being energized by a switch 269 mounted on a plate 270, see FIGURE 8. This switch is actuated by a bar 271 fixed to a cam member 272 secured to the shaft 100. The switch 269 is provided with an actuator 273 pivotally mounted at 274 for movement in a clockwise direction only. Accordingly, as the arm 85 is moved upwardly into operative relation with the heating means 83, the bar 271, moving in a clockwise direction, FIGURE 8, engages the actuator 273 and moves it to the dotted line position 275. However, upon return movement of the arm 85, the bar 271 engages the actuator 273 when the arm 85 is close to return position and this actuation closes the contacts of switch 269 to energize the solenoid valve to provide the fluid pressure to the inner end of the cylinder 262, for actuation of the article ejector to deposit the marked article on the conveyor belt 44.

The mechanism of the listing is enclosed in a casing having side walls 280, 281, mounted on supporting feet 282, FIGURES 20–28. A partition plate 283 is fixed between the side plates 280, 281, and serves to support a framework including uprights 285, to the upper ends of which are secured cross members 286 in which there is journalled a shaft 287. Type segments 288 are carried by spokes 289 journalled on the shaft 287, the spokes extending rearwardly to carry detent segments 280. Each type segment 290 is provided on its periphery with a series of print type 291. The print type wheels are rotatable about the axis of the shaft 287 to bring desired print to the print line for the printing of the list on the invoice 87 when it is positioned in the holder 88. The type 291 on the type wheel segments 288 carry indicia designating the kind of article and the number of the article and may, in addition, carry price indicia. The segments 288 are indexed step by step so that the type on each segment will indicate the number of the kind of article listed. The type segments are indexed by pressing one of the buttons 50–60.

The type wheel segment advancing mechanism is similar to that used to index the bundle number print wheels in the marking machine. An indexing ratchet 293 is pivotally mounted at 294 to an arm 295. Downward movement is imparted to this arm by a link 296, FIGURE 21. The lower end of the link 296 is pivotally connected to a leg 297 of a bell crank member pivotally mounted at 298 to a bracket 299 depending from the partition plate 294. The downwardly extending leg 300 of the bell crank member is pivotally connected to a follower 301, the opposite end of which is of yoke formation straddling a shaft 302 journalled in angle brackets 303, 304, depending from the plate 294. Each follower 301 is provided with a roller 305 engaging the periphery of a cam 306.

The leg 297 of each of the bell cranks is urged downwardly by a tension spring 307. The upper ends of the springs 307 are attached to the legs 297, and the lower ends are attached to a transversely extending member 310 secured at its ends to the brackets 299. Downward movement of each of the bell crank legs 297 is restrained by a latch 311. These latches are pivotally mounted at their lower ends to a transversely extending shaft 312, also carried by the brackets 299.

Each latch 311 is pivotally connected at its upper end to a link 313, which at its opposite end is connected to a bell crank lever pivotally mounted at 315 to a bracket 316 secured to and depending from the base plate 283. The forwardly extending leg 317 of each bell crank is connected by a link 318 to the plunger 319 of a solenoid 320 also carried by the bracket 316. The leg 317 of the bell crank member is urged upwardly by a tension spring 321, which accordingly urges the latch 311 in a clockwise direction, FIGURE 22, into latching engagement with the leg 297 of the actuating bell crank connected to the link 296. Each latch at its upper end is provided with side plates 322 to maintain the latches in proper alignment with the bell crank legs 297.

When a button 50–60 is depressed, power is furnished to the corresponding solenoid 320 to move the latch 311 out of latching engagement with the bell crank leg 297 permitting the spring 307 to move the same downwardly and impart downward movement to the link 296, which effects indexing motion to the latch 287 to index the corresponding print type wheel one step forward.

Simultaneously, with the energization of a solenoid 320, a motor 327 is energized to effect rotation of a shaft 328, which is operatively connected to the cam shaft 302 by a chain drive 330, see FIGURE 24.

The shaft 328 is provided with a disk 340 having a cam lobe 341 arranged to actuate a switch 342 to open the contacts thereof and break the running circuit to the motor 327. Accordingly, the cam 305, corresponding to the released bell crank, makes one revolution permitting the follower 301 to move rearwardly to permit downward movement of the link 296 by spring 307, and to thence move forwardly to move the bell crank leg 297 upwardly for engagement by the corresponding latch 311.

As the cam 306 rotates, the follower 301 is permitted to move rearwardly, this taking place while link 296 is moving downwardly under the influence of spring 307. Upon completion of the downward motion of link 296, the corresponding print type segment 288 is moved upwardly one step. Upon continued rotation of the cam 306, the follower 301 is moved forwardly, moving the leg 297 upwardly for re-engagement by the latch 311.

Figures 20, 25:
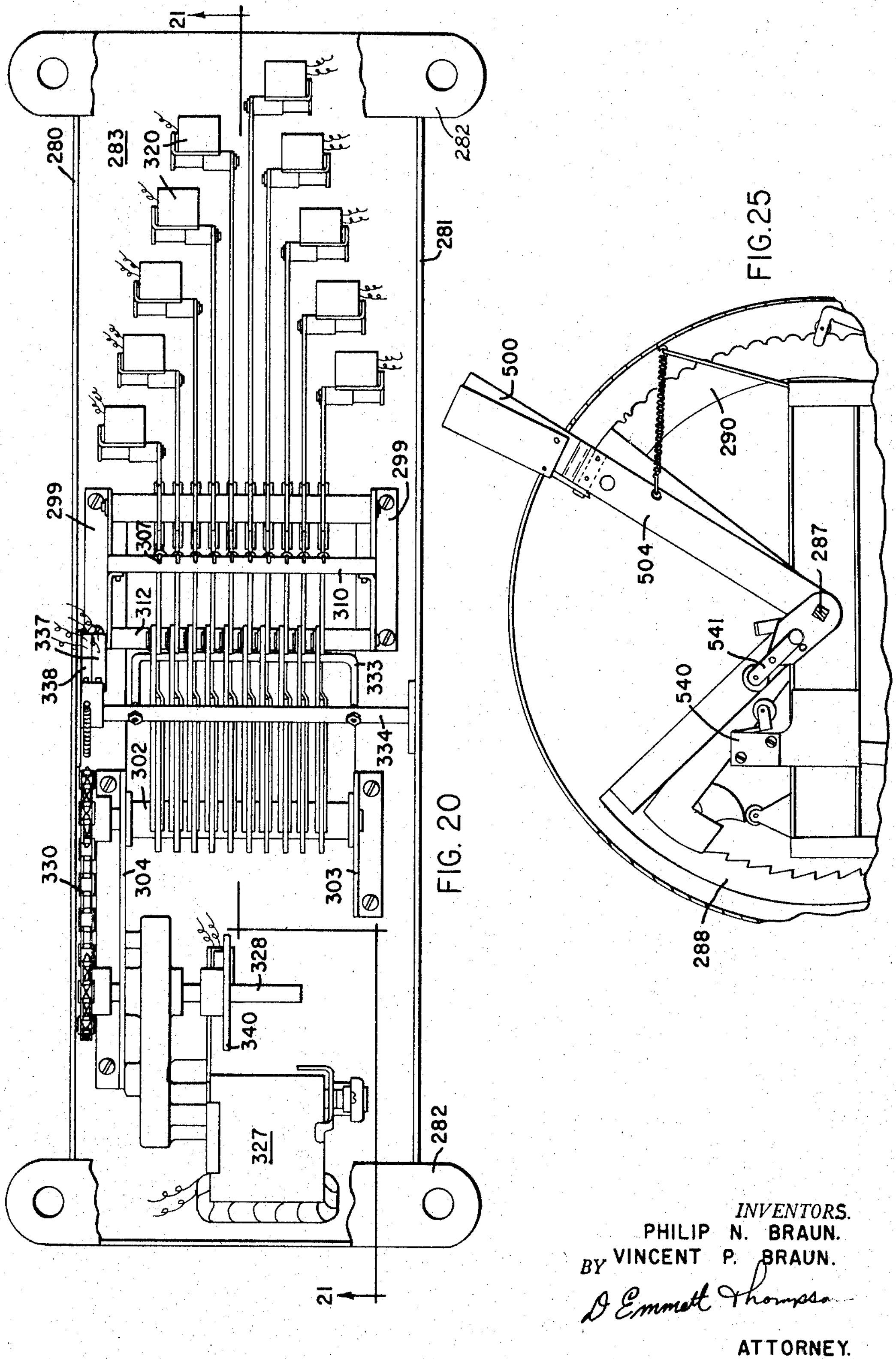
FIGURE 20 is a bottom plan view of the listing machine.
FIGURE 25 is a view, similar to FIGURE 24, showing the upper portion of the print type wheel mechanism, but looking to the left in FIGURE 1.

A U-shaped member 333 is fixed to a shaft 334 journalled between the side plates 280, 281, see FIGURE 20. The U-shaped member 333 is positioned rearwardly of all of the depending legs 300 of the bell crank members, and as the same move rearwardly during the indexing movement, the member 333 is moved rearwardly effecting clockwise rotation of the shaft 334, FIGURE 22. A cam 335 is fixed to the shaft and is arranged to actuate switches 337, 338.

Figure 31:
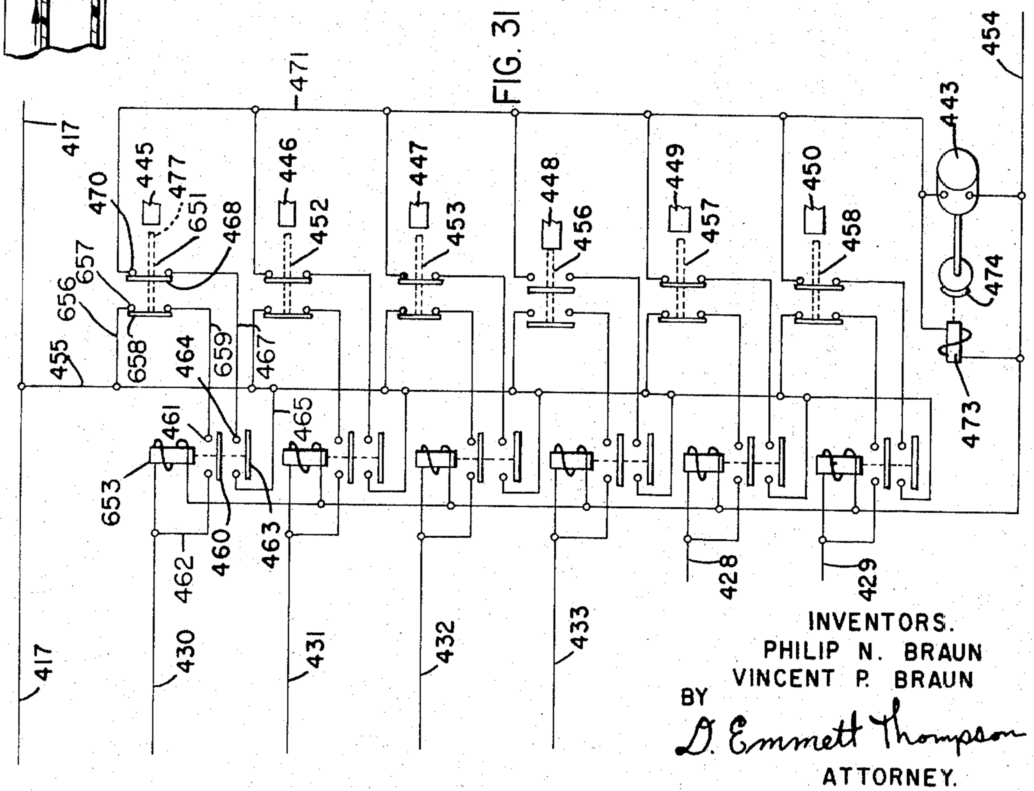
FIGURE 31 is a schematic wiring diagram of the control mechanism for the classifying machine.

The operation of the system will now be explained in conjunction with the wiring diagrams, FIGURES 31, 32. As previously stated, actuation of the push button 80 operates switches 81 and 82 simultaneously. Switch 81 is of the double action toggle type so that its contacts remain closed until another actuation of the button 80. The contacts of switch 82 remain closed only while button 80 is depressed.

Power is supplied from the side 350, through switch 81, wire 351, switch 82, wire 353, switch 354, wire 355 to coil 358 of relay 359, wires 360, 361, to the side 362 of the supply. With coil 358 energized, contact 363 moves into engagement with contact 364. Contact 364 is connected to switch 354 by wires 365, 366. Contact 363 is connected by wires 367 to hot wire 351 to provide a stick circuit for coil 358.

The first operation performed is to mark the invoice by operation of the marking machine. This is done by depressing the button 90. The stem 235 of button 90 is provided with a collar 370. The inner end of the stem extends through an aperture in one leg of an angle lever mounted on the pivot 231, exteriorly of latch 214, see FIGURES 17 and 18. The opposite leg of this member is arranged to actuate a switch 354. When the button 90 is pressed inwardly, the collar 370 engages the vertical leg of the member 372, causing the horizontal leg of the member to move downwardly and actuate the switch 354 to open the contacts thereof.

The opening of the contacts of switch 354 opens the hold circuit to relay coil 358, permitting the relay to drop out.

The operator then opens the bundle of laundry and removes the invoice therefrom and places the invoice in front of the marking means 83 and presses the marked invoice switch 84 located in the console 61. With relay 358 deenergized, there is a circuit provided from the hot wire 367, contact 363, contact 375, wire 376, switch 84, wires 377, 378, to solenoid valve 170, the opposite side of which is connected to the supply side 362. Actuation of the valve 170 provides fluid under pressure to the rear end of cylinder 166, as previously explained, to effect upward movement of the platen arm 85.

Immediately upon such movement of the arm, cam 272, FIGURE 8, actuates switch 380 to close the contacts thereof to provide a hold circuit for the solenoid valve 170 through wire 381, which is connected to the hot wire 351. Cylinder 166 effects upward movement of the article supporting arm 85 until switch 194, FIGURE 3, is closed to energize the solenoid valve for establishing fluid under pressure to cylinder 186, to move the platen 86 under pressure against the invoice to affix the identification tag, then present in front of the heater 83, to affix the tag to the invoice. The arrangement is such, referring to FIGURE 8, that the switch 380 is maintained closed by cam 272 until after the switch 194 is closed by arm 193, FIGURE 3. The timer connected in circuit with switch 194 times out, opening the solenoid valve to exhaust cylinder 186 to permit return movement of the article supporting arm 85 toward normal position and during this movement, the actuator 383 of switch 380 moves about its pivot to the dotted line position, FIGURE 8, whereby the contacts of switch 380 are not again closed upon the return movement of the arm 85.

As the arm 85 approaches return or normal position, the clamp member 91 is automatically moved to open position, as previously explained. Also, switch 269 is operated by actuator 271 to supply fluid pressure to the inner end of cylinder 262 to move the article ejector 86 for ejection of a marked article onto the conveyor belt 44.

When the arm 85 was moved into marking relation with 83, a member 385 on shaft 100 actuated switch 387, see FIGURE 6. This established a circuit from the hot wire 135, switch 387, wires 388, 366, switch 354, wire 355, to solenoid coil 358. As will appear hereinafter, when solenoid 358 is energized, power is disconnected to the button switches 50–60. Accordingly, after marking the invoices, the listing machine is inoperable.

The operator places the marked invoice 87 in the holder 88. The operator then selects the first article from the bundle and places it over the platen 86 and depresses the button 90, which effects movement of the article clamp 91 into clamping position, and also opens the contacts of switch 354 to break the stick circuit established by engagement of contact 363 with contact 364, when relay 358 was pulled in by the operation of switch 387.

With the relay 358 now deenergized, power is supplied to the buttons 50–60. Contact 390 of relay 359 is connected to the hot wire 368 and is now in engagement with contact 391, which is connected by wire 392 to the button switch 60, FIGURE 32. Each of the button switches is provided with a pair of movable contacts 393, 394. The contacts 393 normally engage fixed contacts 395, and are movable into engagement with fixed contacts 396. The contacts 394 normally engage fixed contacts 397 and are actuated into engagement with contacts 398.

The contact 395 of each switch is connected to the movable contact 393 of the adjacent switch by wire 400. The contact 397 of each switch, except switch 50, is connected by wire 401 to the movable contact 394 of the adjacent switch. In other words, the switches 50–60 are arranged in series relation. With power now supplied to this series arrangement by wire 392, power is supplied to wires 403, 404, to relay coil 405, the opposite side of which is connected by wires 360, 361, to the common side 362. With relay 405 energized, there is no circuit extending from wires 368, 407, to wire 408, to supply power to the lister motor 327. It will be apparent that upon depression of any one of the buttons 50–60 for the listing of the first article in the bundle, the power on wire 403 is interrupted and relay 405 is deenergized. The circuit is now completed across contacts 410, 411, of relay 405 to complete a circuit to the motor 327 to effect advancement of the proper print type wheel in the lister, as previously explained. Power is continued to the motor 327 by switch 342, one side of which is connected by wire 413 to wire 368, and the other side of the switch is connected to wire 408 extending to the motor. The opposite side of the motor is connected by wire 414 to wire 361 to the common side 362. When the motor has made one revolution for indexing the print type wheel, it is stopped by the opening of switch 342.

When a button switch 50–60 was depressed, the movable contact 393 thereof was moved into engagement with the contact 396. This supplied power to the corresponding solenoid **320–320*i*, FIGURE 32, to effect movement of the corresponding latch 311 out of engagement with the corresponding leg 297 of the bell crank member to permit the spring 307 to move the indexing link 296** downwardly for the indexing of the proper print type wheel, see FIGURE 21.

Figure 22:
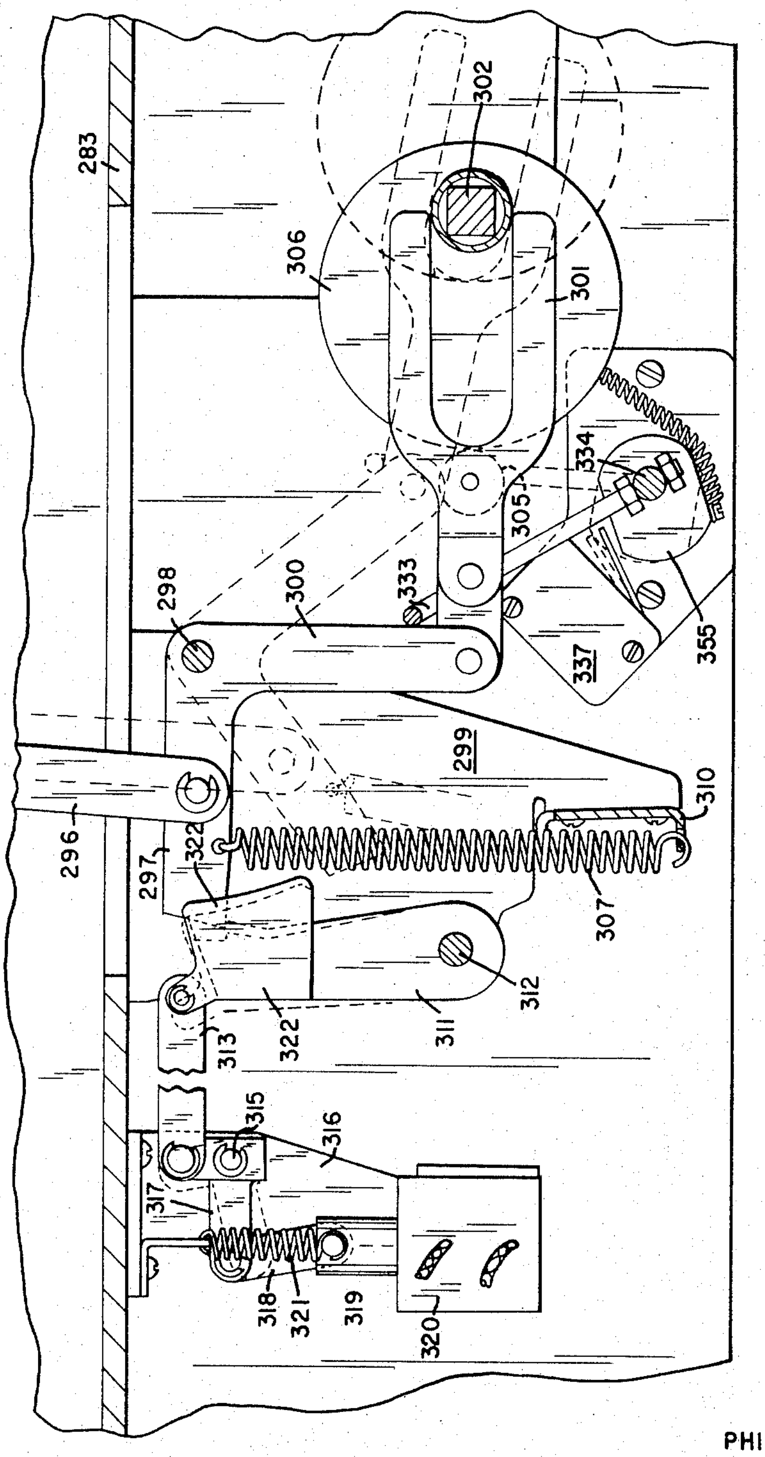
FIGURE 22 is an enlarged view of the print type wheel indexing mechanism shown in the lower central portion of FIGURE 21.
Figure 23:
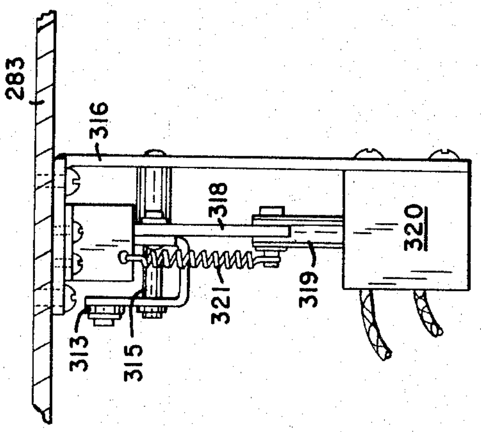
FIGURE 23 is an enlarged view taken on a line corresponding to line 23—23, FIGURE 21.

During the rearward movement of the cam follower 301 in the lister, the switches 338, 337, are actuated by cam 335, FIGURE 22.

The movable contacts 394 of the push button switches 50–60 are continuously supplied with power by wire 417. The fixed contacts 398, which are engaged upon actuation by the contacts 394, are connected to wires 420–429, FIGURE 32, which extend to the classifier, FIGURE 31. Accordingly, when a push button switch 50–60 is actuated, power is supplied to the lister through the corresponding wire 420–429. In the arrangement herein disclosed, the listing machine is provided with ten print type wheels for the listing of 10 kinds of articles. However, the classifier is provided with six article receiving bags 35–40. While it is, of course, necessary to individually list each different kind of article in the bundle, it is not necessary to classify or segregate all of the kinds of articles. Certain kinds of articles, such as sheets and pillowcases, can be combined in the same bag. Accordingly, wires such as 420, 421, may be connected to one outgoing wire 430, wire 422, 423, may be connected to wire 431, wires 424, 425, may be connected to wire 432, and wires 426, 427, may be connected to wire 433.

The turret 34 of the classifier is fixed to the upper end of a shaft 440 journalled for vetrical rotation in a casing 441. The lower end of the shaft is coupled to a gear reduction 442 powered by a motor 443. The shaft 440 is provided with a series of cams 445–450. The cams 445–450 operate a series of switches 451, 452, 453, 456, 457 and 458, mounted in the casing 441.

Assuming the article was listed by operation of the push button switch 50, power was supplied from the wire 417, through contacts 394, 398, wire 420, to wire 430, to provide power to relay 653, the opposite side of which is connected to the opposite side 454 of the supply. Wire 455 is connected to wire 417, and by wire 656, to contact 657 of switch 651. Contact 658 is normally in engagement with contact 657, and is connected by wire 459 to the movable contact of 460 of relay 653, which is now engaging contact 461 to provide, through wire 462, a hold circuit for relay 653.

Contact 463 is now in engagement with contacts 464 one of, which is connected by wire 465 to wire 455. The other contact 464 is connected by wire 467 to the second movable contact 468 of switch 651. Contact 468 is normally in engagement with contact 470 which is connected by wire 471 to the classifier turret motor 443, the opposite side of which is connected by wire 472 to the side 454 of the supply. The energized wire 471 also furnishes power to a brake solenoid 473. The brake 474 is normally applied to the motor output shaft. When the solenoid 473 is energized, the brake is removed.

Accordingly, the turret 34 is rotated until cam 445 engages the actuator 477 of switch 651, moving contacts 658, 468, out of engagement with the contacts 657, 470. The hold circuit for relay 653 is opened by this movement of contact 658, and the power supply to the motor 443 is opened by movement of the contact 468. The cams 445–450 are positioned on the shaft 440 to engage the actuators of the switches 451, 452, 453, 456, 457 and 458 when the respective bag 35–40 is positioned under the discharge end of the conveyor 44.

Switches 337, 338, are actuated by the cam 335 during the indexing of a type wheel, as previously explained. The closing of the contacts of switch 337 establishes a circuit from wire 413, wires 388, 366, switch 354, wire 355, to energize relay coil 358. As previously explained, there is a stick circuit for this relay coil through contact 363. This movement of contact 390 opens the circuit to wire 392, whereby the button switches 50–60 are not supplied with power for another operation of the lister.

Closing the contacts of switch 338 provides a circuit from wire 413 through wire 378, to the solenoid valve 170 which, as previously explained, initiates the marking operation of the article. Upon marking this first article, relay 358 is again energized by operation of switch 387, as previously described, and power is again supplied to the push button switches 50–60 for the listing of the next article by the procedure outlined.

When the operator has listed all of the articles in the bundle, she prints the list on the invoice 87 according to the setting of the print type wheels in the lister and resets the print type wheels to zero, or normal position, for the listing of the next bundle. This operation may be performed by grasping a handle 500 extending through a slot in the top wall 501 of the lister casing. The handle 500 is secured to an arm 502 fixedly secured to the shaft 287. The arm 502 is fixed to a cross member 503 which is attached at its opposite end to a similar arm 504. The cross member 503 is arranged to engage the arms 289 on which the type segments 288 are mounted. It will be apparent upon forward movement of the arms 502, 504, and the cross member 503, the type segments 288 will be all returned to normal position. Where the type is thus reset manually, a pawl 506, pivotally mounted on one of the cross members 286, is arranged for engagement with ratchet teeth 507 formed on the periphery of a quadrant 508 also fixed to the shaft 582. The arrangement is such that upon initial movement of the arms 502, 504, the retrograde movement of the arms is prevented until they have been moved to full forward position for the resetting of the type wheels to zero position.

Figure 27:
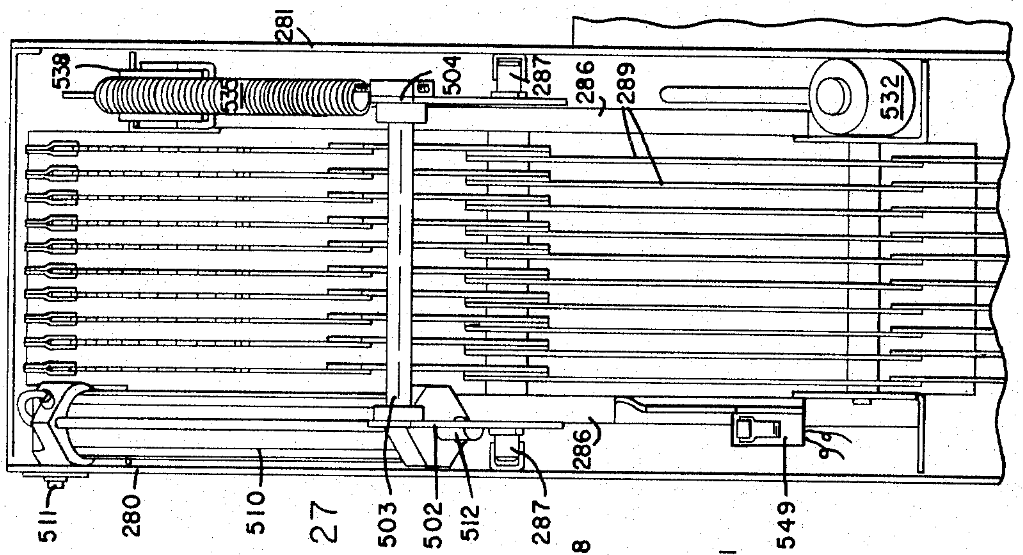
FIGURE 27 is a plan view of the structure shown in FIGURE 26.
Figure 26:
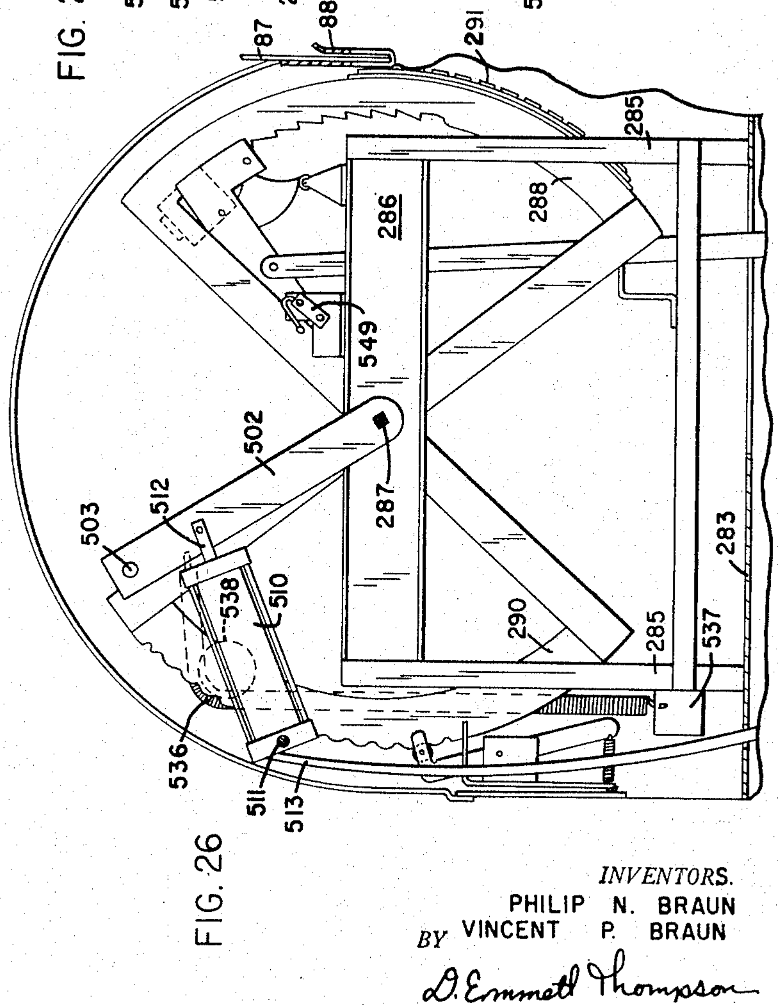
FIGURE 26 is a view similar to FIGURE 24 showing power means for returning the print type wheels to normal position.

Preferably, referring to FIGURES 26 and 27, a pneumatic cylinder 510 is pivotally mounted at one end on pin 511 carried by the side wall 280 of the casing. The piston rod 512 is pivotally connected to the arm 502. When fluid pressure is supplied through the conduit 513, the arms 502, 504 are moved forwardly to effect the resetting of the print type wheel.

Figure 28:
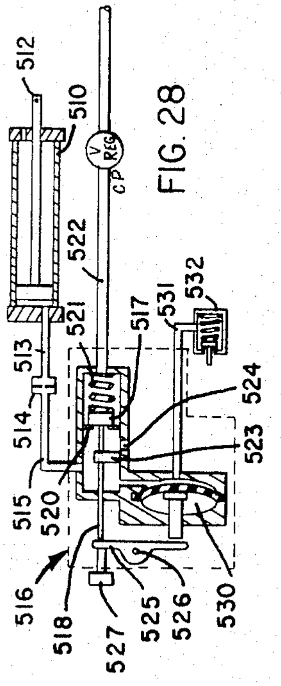
FIGURE 28 is a diagram of the pneumatic circuitry for operating the cylinder shown in FIGURES 26 and 27.
Figure 29:
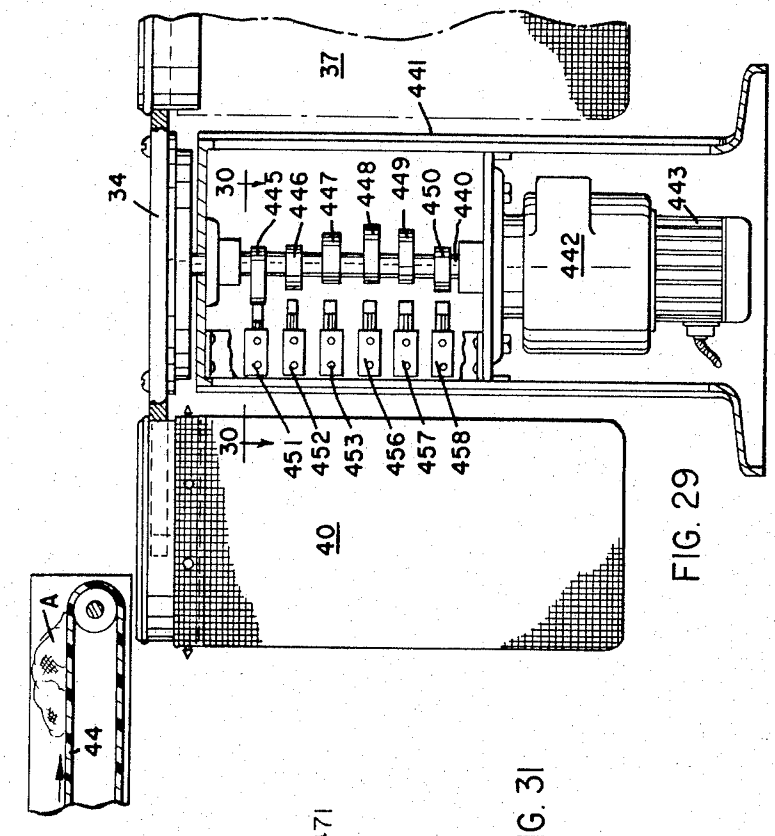
FIGURE 29 is a vertical sectional view of the classifying machine and the contiguous discharge end of the conveyor.
Figure 30:
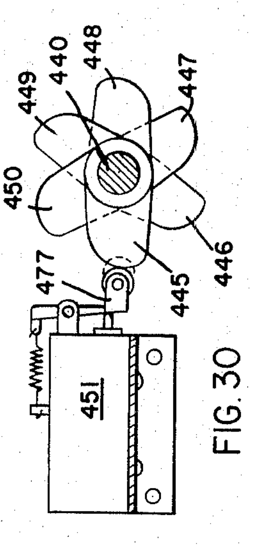
FIGURE 30 is a view taken on line 27—27, FIGURE 26.

The conduit 513 is connected through a flow regulator 514, FIGURE 28, and conduit 515 to a valve casing 516. A valve 517 is mounted on a stem 518 and is yieldingly urged against a seat 520 by compression spring 521 to close off the flow of fluid pressure from supply conduit 522 to the conduit 515. A second valve 523 is mounted on the stem 518. When the stem 518 is pressed inwardly, valve 523 closes exhaust port 524. An actuator 525 is pivotally mounted at 526, and is provided with an operating button 527. When the button 527 is pressed inwardly, the valve 517 is moved from the seat 520 to permit the flow of fluid under pressure into the conduit 515 and into the cylinder 510. At this time valve 523 is positioned over exhaust port 524. This fluid pressure is also admitted forwardly of the diaphragm 530, which is provided with a stem 531 to hold the stem 518 and valve 517 inwardly. The area in front of the diaphragm 530 is connected by a conduit 531 to a bleed-off valve 532 which is opened to atmosphere when the arm 504 is moved all the way to forward position.

The solenoid is bled quickly from in front of the diaphragm 530, permitting spring 521 to move valve 517 into engagement with seat 520 and to move valve 523 out of registration with the exhaust port 524. The fluid pressure thereupon is exhausted from the cylinder 510.

The arms 502, 504, are returned to normal position by a tension spring 535, one end of which is attached to the arm 504, and the opposite end to a bracket 537, see FIGURE 26. The spring is trained over a roller 538.

Upon the initial forward movement of the arms 502, 504, a switch 540 is actuated by an actuator 541, FIGURE 25, rotatable with shaft 287. Switch 540 supplies power from wire 368, FIGURE 32, to print solenoid 543, the opposite side of which is connected to wire 414. The solenoid 543, FIGURE 21, when energized, effects movement of the print platen 545 against the print ribbon 546 and, in turn, against the invoice 87.

When the arms 502, 504 have been moved forward to reset the print type segments 88 to normal position, wherein 502 actuates a switch 549 to establish a circuit from wire 413 through wire 550 to the motor 121 to effect indexing of the bundle number print wheel in the marking machine to the next number. The motor 121 is provided with a running circuit from wire 135 through wire 557, switch 558, wire 559 to the wire 550. When the crank disk 120, FIGURES 3 and 5, have made one revolution to effect indexing of the bundle number print type wheel, the contacts of switch 558 are opened.

When solenoid pressure was provided to the cylinders 166, 186, as above stated, to effect movement of the article supporting arm 85 upwardly and into operative relation with the marking means 83, and upon the return movement of the arm to normal position, cam member 272, FIGURE 8, actuates a switch 560. The conveyor belt 44 is operated by a motor 561, FIGURE 4, through a gear reduction 563, the output of which is provided with an electro-magnetic clutch 564. The motor 561 runs continuously. Upon actuation of the switch 560, power is supplied to the clutch 564 to effect its engagement for driving the conveyor belt 44. There is a timer 565 in the circuit between the switch 560 and the clutch 564. The timer functions to maintain the clutch 564 in engagement for a predetermined period to effect transfer of the article A ejected from the marking machine to the receptacle 35–40 that is positioned at the discharge end of the conveyor.

After the printing of the invoice and resetting the print type wheels of the lister to normal position and effecting the advancement of the bundle number on the marking machine, the operator is ready to list the articles in the next bundle.

What we claim is:

1. In a system for listing, marking and classifying articles in a bundle of laundry, a listing machine operable upon each actuation to list an article of a kind, article classifying apparatus, an article marking machine for affixing an identification mark to each listed article, said classifying apparatus being in juxtaposition to the marking machine and having means for receiving successive articles discharged from said marking machine to accumulate said articles in related groups, means operable subsequent to actuation of said listing machine for discharging a listed and marked article from said marking machine to said classifying apparatus, said classifying apparatus having members selectively movable in response to actuations of said listing machine to accumulate the listed and marked articles of a kind into a group.

2. In a system for listing, marking and classifying articles in a bundle of laundry, a listing machine, a marking machine, said listing machine being operable upon each actuation thereof to list an article of a kind and to render said marking machine operable for affixing an identification mark to a listed article, said classifying apparatus being in juxtaposition to the marking machine and having means for receiving successive articles discharged from said marking machine to accumulate said articles in related groups, means operable subsequent to the actuation of said listing machine for discharging a listed and marked article from said marking machine to said classifying apparatus, and said classifying apparatus having members selectively movable in response to actuations of said listing machine to accumulate the listed and marked articles of a kind into a group.

3. In a system for listing, marking and classifying articles in a bundle of laundry, a listing machine operable upon each actuation to list an article of a kind, a classifying apparatus, an article marking machine, article conveying means extending from said marking machine to said classifying apparatus, said marking machine being operable to affix an identification mark on an article and, subsequent to actuation of said lister, to deposit the marked article on said conveying means, said classifying apparatus having means operable in response to actuations of said listing machine to accumulate the listed articles of a kind advancing on said conveyor means into a group, and a single switch means operable to initiate substantially simultaneous actuation of said listing machine, classifying machine and marking machine.

4. In a system for listing, marking and classifying articles in a bundle of laundry, a listing machine having a plurality of print type wheels, each wheel having type for printing a kind of article and being movable from one print position to the next for printing the number of articles of a kind, a marking machine operable to affix an identification mark to an article positioned on the marking machine, a classifying machine, a conveyor operable to convey a marked article from said marking machine to said classifying machine, said marking machine including means for depositing a marked article on said conveyor, said classifying machine being operable to accumulate like articles into a group, an actuating switch corresponding to each print type wheel on said lister, means operable upon actuation of one of said actuating switches to effect advancement of the corresponding print wheel to the next print position and to effect operation of said marking machine and classifier in timed relation.

5. In a system for listing, marking and classifying articles in a bundle of laundry, a listing machine having a plurality of print type wheels, each wheel having type for printing a kind of article and being movable from one print position to the next for printing the number of articles of a kind, a marking machine operable to affix an identification mark to an article positioned on the marking machine, a classifying machine, a conveyor operable to convey a marked article from said marking machine to said classifying machine, said marking machine including means for depositing a marked article on said conveyor, said classifying machine being operable to accumulate like articles into a group, a listing switch corresponding to each print type wheel on said lister, means operable upon actuation of one of said listing switches to effect advancement of the corresponding print wheel to the next print position and to effect operation of said marking machine and classifier in timed relation.

References Cited

UNITED STATES PATENTS

| | | | |
|---|---|---|---|
| 1,695,964 | 12/1928 | Lang | 101—72 |
| 1,799,408 | 4/1931 | Bull | 101—93 |
| 1,836,113 | 12/1931 | Garvey | 93—87 |
| 1,989,976 | 2/1935 | Fuller | 101—2 |
| 2,119,713 | 6/1938 | Lang | 101—97 |
| 2,122,136 | 6/1938 | Fuller et al. | 101—2 |
| 2,307,150 | 1/1943 | Miller et al. | 101—2 |
| 2,412,830 | 12/1946 | Nelson et al. | 101—2 |
| 2,528,740 | 11/1950 | Carothers et al. | 101—95 |
| 2,672,810 | 3/1954 | Keuper | 101—95 |

WILLIAM B. PENN, *Primary Examiner.*